United States Patent
Teranishi

(10) Patent No.: US 11,400,972 B2
(45) Date of Patent: Aug. 2, 2022

(54) WORK VEHICLE

(71) Applicant: KOMATSU LTD., Tokyo (JP)

(72) Inventor: Yuichi Teranishi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 148 days.

(21) Appl. No.: 16/768,181

(22) PCT Filed: Feb. 20, 2019

(86) PCT No.: PCT/JP2019/006263
§ 371 (c)(1),
(2) Date: May 29, 2020

(87) PCT Pub. No.: WO2019/234987
PCT Pub. Date: Dec. 12, 2019

(65) Prior Publication Data
US 2020/0290672 A1    Sep. 17, 2020

(30) Foreign Application Priority Data

Jun. 6, 2018 (JP) .................................. 2018-108949

(51) Int. Cl.
*B62D 6/00* (2006.01)
*B62D 1/12* (2006.01)
(Continued)

(52) U.S. Cl.
CPC .............. *B62D 6/008* (2013.01); *B62D 1/12* (2013.01); *B62D 5/006* (2013.01); *B62D 5/091* (2013.01);
(Continued)

(58) Field of Classification Search
CPC .......... B62D 6/008; B62D 1/12; B62D 5/006; B62D 5/091; B62D 12/00; E02F 9/2004;
(Continued)

(56) References Cited

U.S. PATENT DOCUMENTS 6,179,082 B1 * 1/2001 Ikari ........................ B62D 5/06
                                                      180/418
10,266,200 B2 * 4/2019 Takenaka ............... B62D 6/002
(Continued)

FOREIGN PATENT DOCUMENTS

CN          1652961 A      8/2005
CN         102530050 A     7/2012
(Continued)

OTHER PUBLICATIONS

The International Search Report for the corresponding international application No. PCT/JP2019/006263, dated Apr. 2, 2019.
(Continued)

*Primary Examiner* — Kevin Hurley
*Assistant Examiner* — Marlon A Arce
(74) *Attorney, Agent, or Firm* — Global IP Counselors, LLP

(57) ABSTRACT

A work vehicle includes a hydraulic actuator that changes an actual steering angle, an actual steering angle detecting part, an operating unit that performs a steering operation, a position adjusting control part that controls the position adjusting part based on the actual steering angle, and a steering control part that controls the hydraulic actuator. The operating unit includes a support part, a rotating part supported rotatably by the support part, an operating part supported rotatably by the support part or the rotating part, a biasing part that biases the operating part to a predetermined position with respect to the rotating part, a position adjusting part that adjusts a rotation angle of the rotating part with respect to the support part, and a rotation angle detecting part configured to detect the rotation angle of the operating part with respect to the support part or the rotating part.

19 Claims, 25 Drawing Sheets

(51) Int. Cl.
  *B62D 5/00* (2006.01)
  *B62D 5/09* (2006.01)
  *B62D 12/00* (2006.01)
  *E02F 9/20* (2006.01)
  *E02F 9/22* (2006.01)
  *E02F 3/34* (2006.01)

(52) U.S. Cl.
  CPC ............ *B62D 12/00* (2013.01); *E02F 9/2004* (2013.01); *E02F 9/225* (2013.01); *E02F 9/2221* (2013.01); *E02F 3/3417* (2013.01)

(58) Field of Classification Search
  CPC ....... E02F 9/2221; E02F 9/225; E02F 3/3417; G05G 2009/04766; G05G 9/047
  See application file for complete search history.

(56) References Cited

U.S. PATENT DOCUMENTS

| | | | |
|---|---|---|---|
| 10,865,543 B2 * | 12/2020 | Takenaka | ................ B62D 1/12 |
| 2002/0063015 A1 | 5/2002 | Sugitani et al. | |
| 2005/0205311 A1 | 9/2005 | Kanaka et al. | |
| 2013/0068544 A1 * | 3/2013 | Itou | ..................... B62D 11/003 |
| | | | 180/6.5 |
| 2014/0052338 A1 | 2/2014 | Gaedke | |
| 2016/0023679 A1 | 1/2016 | Matsuoka | |
| 2016/0375923 A1 | 12/2016 | Schulz et al. | |
| 2018/0105202 A1 * | 4/2018 | Ikari | .................... B62D 5/006 |

FOREIGN PATENT DOCUMENTS

| | | |
|---|---|---|
| CN | 103547502 A | 1/2014 |
| CN | 105102305 A | 11/2015 |
| CN | 106428185 A | 2/2017 |
| DE | 198 45 814 A1 | 4/1999 |
| EP | 3 254 935 A1 | 12/2017 |
| JP | 2000-250649 A | 9/2000 |
| JP | 2002-160642 A | 6/2002 |
| JP | 2006-1547 A | 1/2006 |
| JP | 2006-168515 A | 6/2006 |
| JP | 2017-81479 A | 5/2017 |
| JP | 2018-83504 A | 5/2018 |

OTHER PUBLICATIONS

The extended European search report for the corresponding European application No. 19814217.6, dated Jul. 2, 2021.

Office Action for the corresponding Chinese application No. 201980006203.2, dated Dec. 2, 2021.

* cited by examiner

WORK VEHICLE

CROSS-REFERENCE TO RELATED APPLICATIONS

This application is a U.S. National stage application of International Application No. PCT/JP2019/006263, filed on Feb. 20, 2019. This U.S. National stage application claims priority under 35 U.S.C. § 119(a) to Japanese Patent Application No. 2018-108949, filed in Japan on Jun. 6, 2018, the entire contents of which are hereby incorporated herein by reference.

BACKGROUND

Field of the Invention

The present invention relates to a work vehicle.

Background Information

There is a steering system (also known as steer-by-wire) in which the rotation amount and the like of a steering input device is detected with sensors, and a control signal that is calculated on the basis of the sensor information of the sensors is transmitted, via a wire harness, to an actuator that controls the turning angles of the tires. A joystick lever may be used in place of a steering wheel as the input device of the steering system in this type of vehicle.

In a steer-by-wire system that uses a joystick lever as the input device, there may be provided a joystick lever with which a turning operation is performed, and a motor that imparts a counterforce and the like to the operation in order to produce an operational feel in the turning operation of the joystick lever. (For example, see Japanese Patent Laid-open No. 2002-160642)

SUMMARY

In order to produce sufficient counterforce torque in the joystick lever in the vehicle of Japanese Patent Laid-open No. 2002-160642, it is necessary to provide an intensifying device (speed reducer) between the motor and the joystick lever to increase the motor torque.

However, if the speed reduction ratio is increased, the operational counterforce may become too large when operating the joystick lever. For example, if the counterforce is not desired to be generated, the current supplied to the motor may be set to 0, but even in that case, the friction torque and cogging torque of the motor are increased by the speed reducer, and a counterforce may be produced on the joystick lever.

As a result, it is necessary to reduce the speed reduction ratio of the speed reducer and use a motor that has a large torque and it becomes necessary to use a large-scale motor. Accordingly, when an operation unit increases in size due to the use of the large-scale motor, there is another problem in that it becomes difficult to adjust the position of the operation unit to a position that suits the body type or the like of the user.

An object of the present invention is to provide a work vehicle in which the size of an operation unit can be reduced.

A work vehicle according to an aspect of the invention comprises a hydraulic actuator, an actual steering angle detecting part, an operating unit, a position adjustment control part, and a steering control part. The hydraulic actuator changes an actual steering angle. The actual steering angle detecting part detects the actual steering angle. The operating unit has a support part, a rotating part, an operating part, a biasing part, a position adjusting part, and a first rotation angle detecting part, and performs a steering operation. The rotating part is rotatably supported by the support part. The operating part is rotatably supported by the support part or the rotating part and is rotated by an operator. The biasing part biases the operating part to a predetermined position with respect to the rotating part. The position adjusting part adjusts the rotation angle of the rotating part with respect to the support part. The first rotation angle control part detects the rotation angle of the operating part with respect to the support part. The position adjusting control part controls the position adjusting part on the basis of the actual steering angle. The steering control part controls the hydraulic actuator on the basis of a difference between an input steering angle, which corresponds to the rotation angle of the operating part, and the actual steering angle.

A work vehicle according to another aspect of the invention comprises a hydraulic actuator, an actual steering angle detecting part, an operating unit, a position adjustment control part, and a steering control part. The hydraulic actuator changes the actual steering angle. The actual steering angle detecting unit detects the actual steering angle. The operating unit has a support part, a rotating part, an operating part, a biasing part, a position adjusting part, and a second turning angle detecting part, and performs a steering operation. The rotating part is rotatably supported by the support part. The operating part is rotatably supported by the support part or the rotating part and is rotated by an operator. The biasing part biases the operating part to a predetermined position with respect to the rotating part. The position adjusting part adjusts the rotation angle of the rotating part with respect to the support part. The second rotation angle control part detects the rotation angle of the operating part with respect to the rotating part. The position adjusting control part controls the position adjusting part on the basis of the actual steering angle. The steering control part controls the hydraulic actuator on the basis of the rotation angle of the operating part.

The present invention is able to provide a work vehicle in which the size of an operation unit can be reduced.

DETAILED DESCRIPTION OF EMBODIMENT(S)

The following is an explanation of a wheel loader as an example of a work vehicle according to the present invention with reference to the drawings.

Embodiment 1

A wheel loader 1 of a first embodiment according to the present invention is explained hereinbelow.
<1. Configuration>
(1-1. Outline of Configuration of Wheel Loader)

Figure 1:
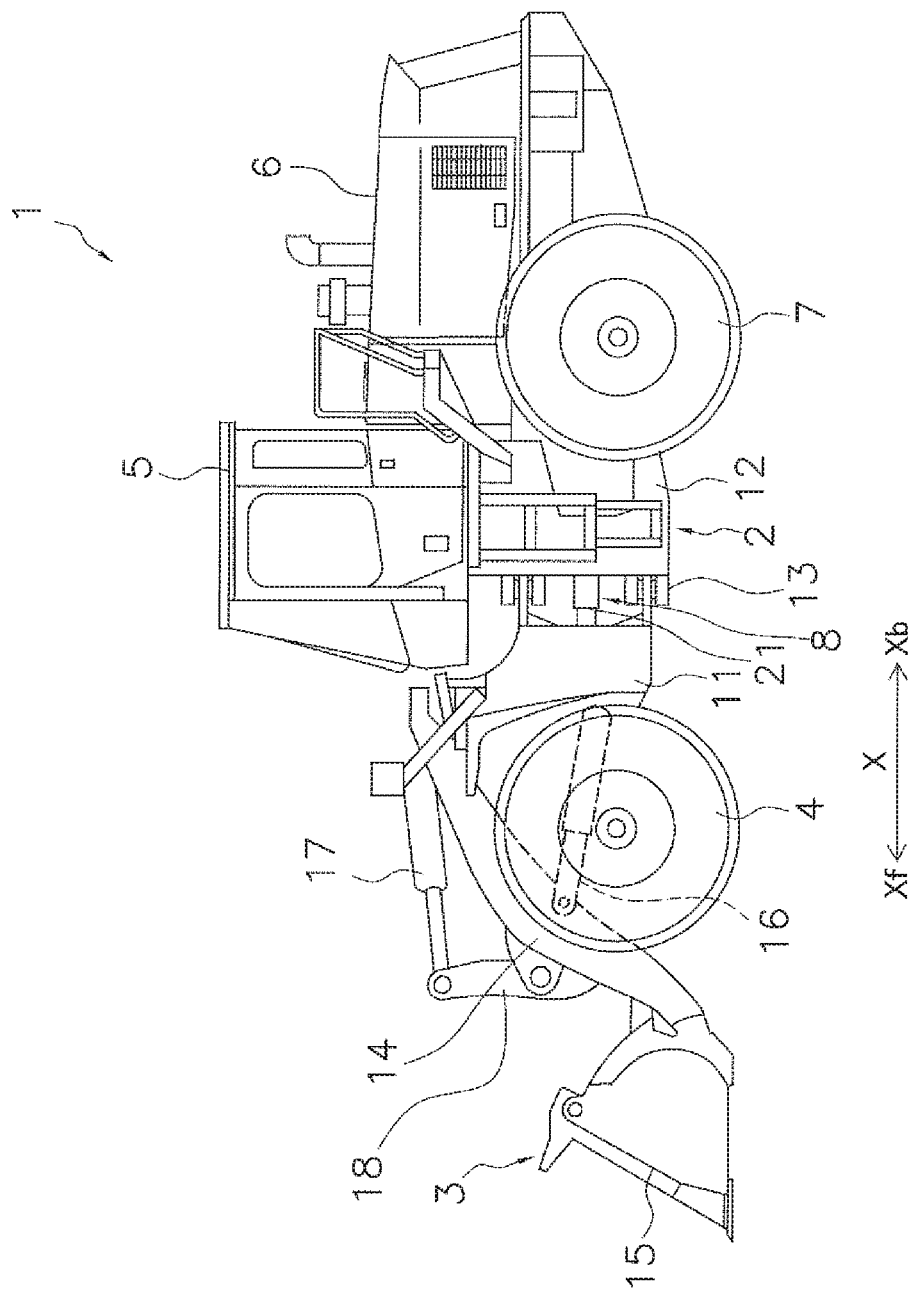
FIG. 1 is side view illustrating a wheel loader of a first embodiment according to the present invention.

FIG. 1 is a schematic view of a configuration of the wheel loader 1 of the present embodiment. The wheel loader 1 of the present embodiment is provided with a vehicle body frame 2, a work implement 3, a pair of front tires 4, a cab 5, an engine room 6, a pair of rear tires 7, and a steering operating device 8 (refer to FIG. 2 below). In the following explanations, "front," "rear," "right," "left," "up," and "down" indicate directions relative to a state of looking forward from the driver's seat. "Vehicle width direction" and "left-right direction" have the same meaning. In FIG. 1, "X" indicates the front-back direction and "Xf" is used to indicate the forward direction and "Xb" is used to indicate the rearward direction. In addition, the left-right direction is indicated with "Y," and "Yr" is used to indicate the rightward direction and "Yl" is used to indicate the leftward direction in the following drawings.

The wheel loader 1 is able to carry out work such as earth and sand loading by using the work implement 3.

The vehicle body frame 2 is a so-called articulated type and includes a front frame 11, a rear frame 12, and a coupling shaft part 13. The front frame 11 is arranged in front of the rear frame 12. The coupling shaft part 13 is provided in the center in the vehicle width direction and couples the front frame 11 and the rear frame 12 to each other in a manner that allows swinging. The pair of front tires 4 are attached to the left and right of the front frame 11. The pair of rear tires 7 are attached to the left and right of the rear frame 12.

The work implement 3 is driven by hydraulic fluid from a work implement pump which is not illustrated. The work implement 3 includes a boom 14, a bucket 15, a lift cylinder 16, and a bucket cylinder 17. The boom 14 is mounted onto the front frame 11. The bucket 15 is attached to the tip of the boom 14.

The lift cylinder 16 and the bucket cylinder 17 are hydraulic cylinders. One end of the lift cylinder 16 is attached to the front frame 11 and the other end of the lift cylinder 16 is attached to the boom 14. The boom 14 swings up and down due to the extension and contraction of the lift cylinder 16. One end of the bucket cylinder 17 is attached to the front frame 11 and the other end of the bucket cylinder 17 is attached to the bucket 15 via a bell crank 18. The bucket 15 swings up and down due to the extension and contraction of the bucket cylinder 17.

The cab 5 is disposed on the rear frame 12. A handle or a joystick lever 51 (see FIG. 2 below) for performing steering operations, a lever for operating the work implement 3, and various display devices are arranged inside the cab 5. The engine room 6 is arranged to the rear of the cab 5 and on the rear frame 12 and contains an engine.

While explained in detail below, the steering operating device 8 has steering cylinders 21 and 22, and changes the vehicle body frame angle of the front frame 11 with respect to the rear frame 12 by changing the flow rate of oil supplied to the steering cylinders 21 and 22, to change the traveling direction of the wheel loader 1. The steering cylinders 21 and 22 correspond to an example of a hydraulic actuator.

Figure 2:
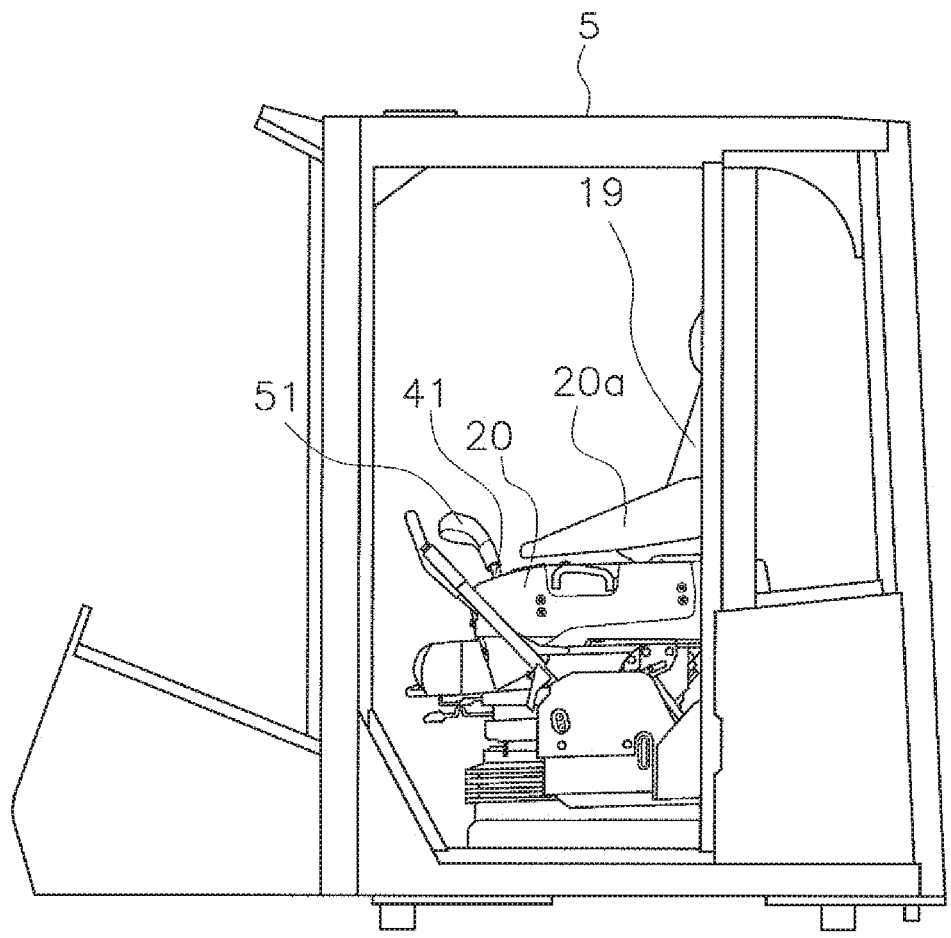
FIG. 2 is a side view illustrating the vicinity of a cab in FIG. 1.

FIG. 2 is a partial side view of the cab 5. An operator's seat 19 is provided in the cab 5 and a console box 20 is arranged to the side of the operator's seat. An arm rest 20a is arranged on the upper side of the console box 20. A lever unit 41 is arranged at the front end part of the console box 20, and the joystick lever 51 is arranged extending upward from the front end part of the console box 20.
(1-2. Steering Operating Device)

Figure 3:
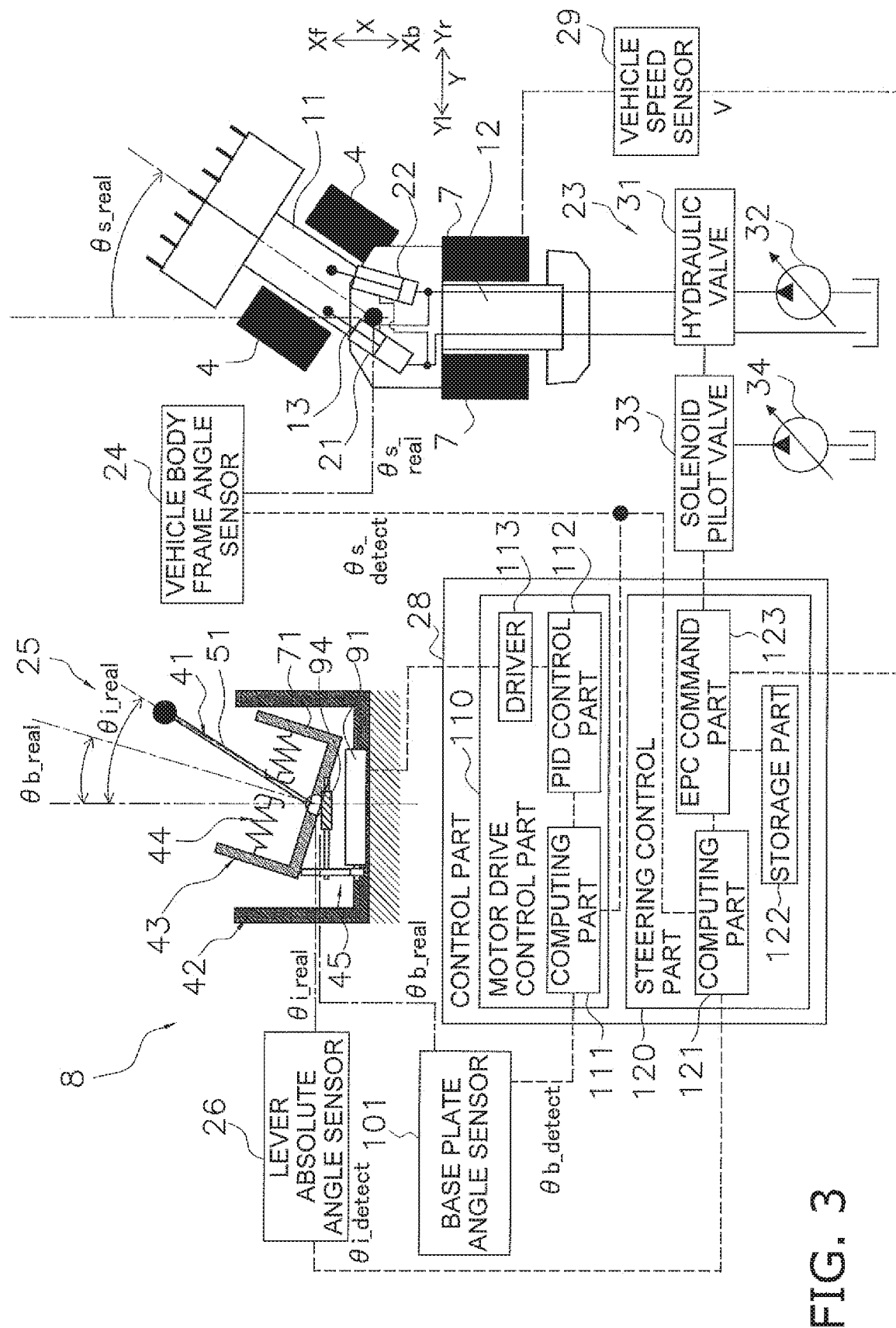
FIG. 3 is a configuration view illustrating a steering operating device in FIG. 1.

FIG. 3 is a configuration view illustrating the steering operating device 8. The steering operating device 8 of the present embodiment has the pair of steering cylinders 21 and 22, a steering hydraulic circuit 23, a vehicle body frame angle sensor 24, an operating unit 25, a lever absolute angle sensor 26, a base plate angle detecting unit 27 (see FIG. 4A) provided with a base plate angle sensor 101, a control part 28, and a vehicle speed sensor 29. In FIG. 3, the transmission of signals on the basis of electricity is represented by the dotted lines, and transmission on the basis of hydraulics is represented by solid lines. Additionally, detection by sensors is represented by one dot chain lines. The operating unit 25 is illustrated schematically in FIG. 3. The vehicle body frame angle sensor 24 corresponds to an example of the actual steering angle detecting part. The lever absolute angle sensor 26 corresponds to an example of the first rotation angle detecting part.

(1-2-1. Steering Cylinder)

The pair of steering cylinders 21 and 22 are driven by hydraulic pressure. The pair of steering cylinders 21 and 22 are arranged side by side on the left and right sides in the vehicle width direction with the coupling shaft part 13 interposed therein. The steering cylinder 21 is arranged on the left side of the coupling shaft part 13. The steering cylinder 22 is arranged on the right side of the coupling shaft part 13. One end of each of the steering cylinders 21 and 22 is attached to the front frame 11 and the other end each is attached to the rear frame 12.

When the steering cylinder 21 extends and the steering cylinder 22 contracts due to hydraulic pressure from the below mentioned steering hydraulic circuit 23, an actual vehicle body frame angle θs_real is changed and the vehicle turns to the right. When the steering cylinder 21 contracts and the steering cylinder 22 extends due to hydraulic pressure from the steering hydraulic circuit 23, the actual vehicle body frame angle θs_real is changed and the vehicle turns to the left. In the present embodiment, the actual vehicle body frame angle θs_real when the front frame 11 and the rear frame 12 are arranged in the front-back direction is set to zero, the right side is a positive value, and the left side is a negative value. The actual vehicle body frame angle θs_real corresponds to an example of the actual steering angle.

(1-2-2. Steering Hydraulic Circuit)

The steering hydraulic circuit 23 is a hydraulic circuit for adjusting the flow rate of the oil supplied to the steering cylinders 21 and 22. The steering hydraulic circuit 23 has a hydraulic valve 31, a main pump 32, a solenoid pilot valve 33, and a pilot pump 34.

The hydraulic valve 31 is a flow rate adjustment valve for adjusting the flow rate of the oil supplied to the steering cylinders 21 and 22 in response to an inputted pilot pressure. A spool valve, for example, is used as the hydraulic valve 31. The main pump 32 supplies hydraulic fluid for actuating the steering cylinders 21 and 22 to the hydraulic valve 31. The hydraulic valve 31 has an obturating element (not illustrated) that is capable of moving between a left steering position, a neutral position, and a right steering position. When the obturating element is arranged in the left steering position in the hydraulic valve 31, the steering cylinder 21 contracts and the steering cylinder 22 extends, whereby the actual vehicle body frame angle θs_real decreases and the vehicle body turns to the left. When the obturating element is arranged in the right steering position in the hydraulic valve 31, the steering cylinder 22 contracts and the steering cylinder 21 extends, whereby the actual vehicle body frame angle θs_real increases and the vehicle body turns to the right. When the obturating element is arranged in the neutral position in the hydraulic valve 31, the actual vehicle body frame angle θs_real does not change.

The solenoid pilot valve 33 corresponds to an example of a control valve and is a flow rate adjustment valve for adjusting the flow rate of pilot hydraulic pressure supplied to the hydraulic valve 31 in response to a command from the control part 28. A spool valve, for example, is used as the solenoid pilot valve 33. The pilot pump 34 supplies hydraulic fluid for actuating the hydraulic valve 31 to the solenoid pilot valve 33. The solenoid pilot valve 33 is, for example, a spool valve or the like and is controlled in accordance with commands from the control part 28. The solenoid pilot valve 33 has an obturating element (not illustrated) that can be moved between a left pilot position, a neutral position, and a right pilot position. When the obturating element of the solenoid pilot valve 33 is arranged in the left pilot position, the hydraulic valve 31 enters the state of the left steering position. When the obturating element of the solenoid pilot valve 33 is arranged in the right pilot position, the hydraulic valve 31 enters the state of the right steering position. When the obturating element of the solenoid pilot valve 33 is arranged in the neutral position, the hydraulic valve 31 enters the state of the neutral position.

As described above, the pilot pressure from the solenoid pilot valve 33 is controlled in response to commands from the control part 28, whereby the hydraulic valve 31 is controlled and the steering cylinders 21 and 22 are controlled.

(1-2-3. Vehicle Body Frame Angle Sensor 24)

The vehicle body frame angle sensor 24 detects the actual vehicle body frame angle θs_real as a detection value θs_detect (also referred to as the vehicle body frame angle) of the vehicle body frame angle. The vehicle body frame angle sensor 24 is arranged in the proximity to the coupling shaft part 13 arranged between the steering cylinders 21 and 22. The vehicle body frame angle sensor 24 is configured, for example, by a potentiometer, and the detected detection value θs_detect of the vehicle body frame angle is sent to the control part 28 as a detection signal.

A cylinder stroke sensor for detecting the cylinder stroke may be provided on each of the steering cylinders 21 and 22 and the detection values of the cylinder stroke sensors may be sent to the control part 28 and the detection value θs_detect of the vehicle body frame angle may be detected.

(1-2-4. Operating Unit 25)

Figure 4A:
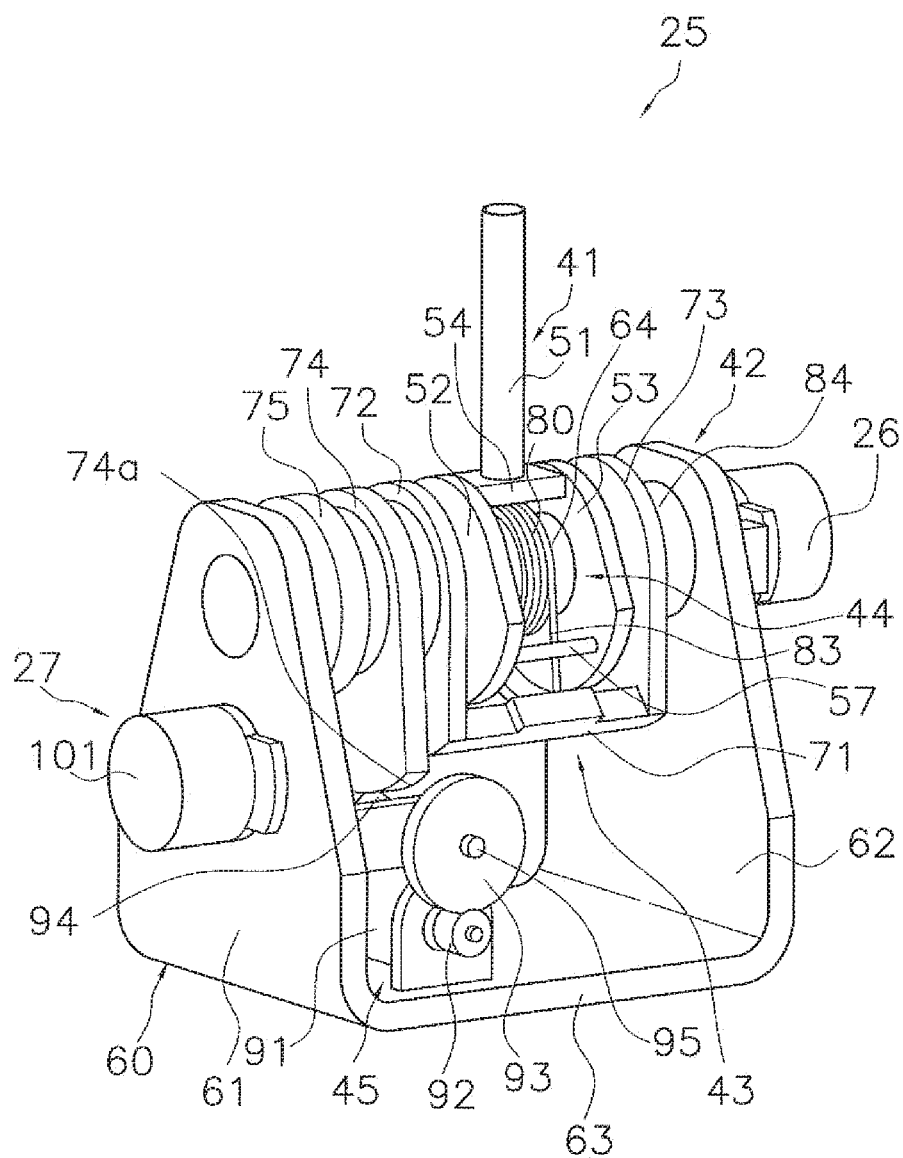
FIG. 4A is a perspective view illustrating an operating unit of FIG. 3.
Figure 4B:
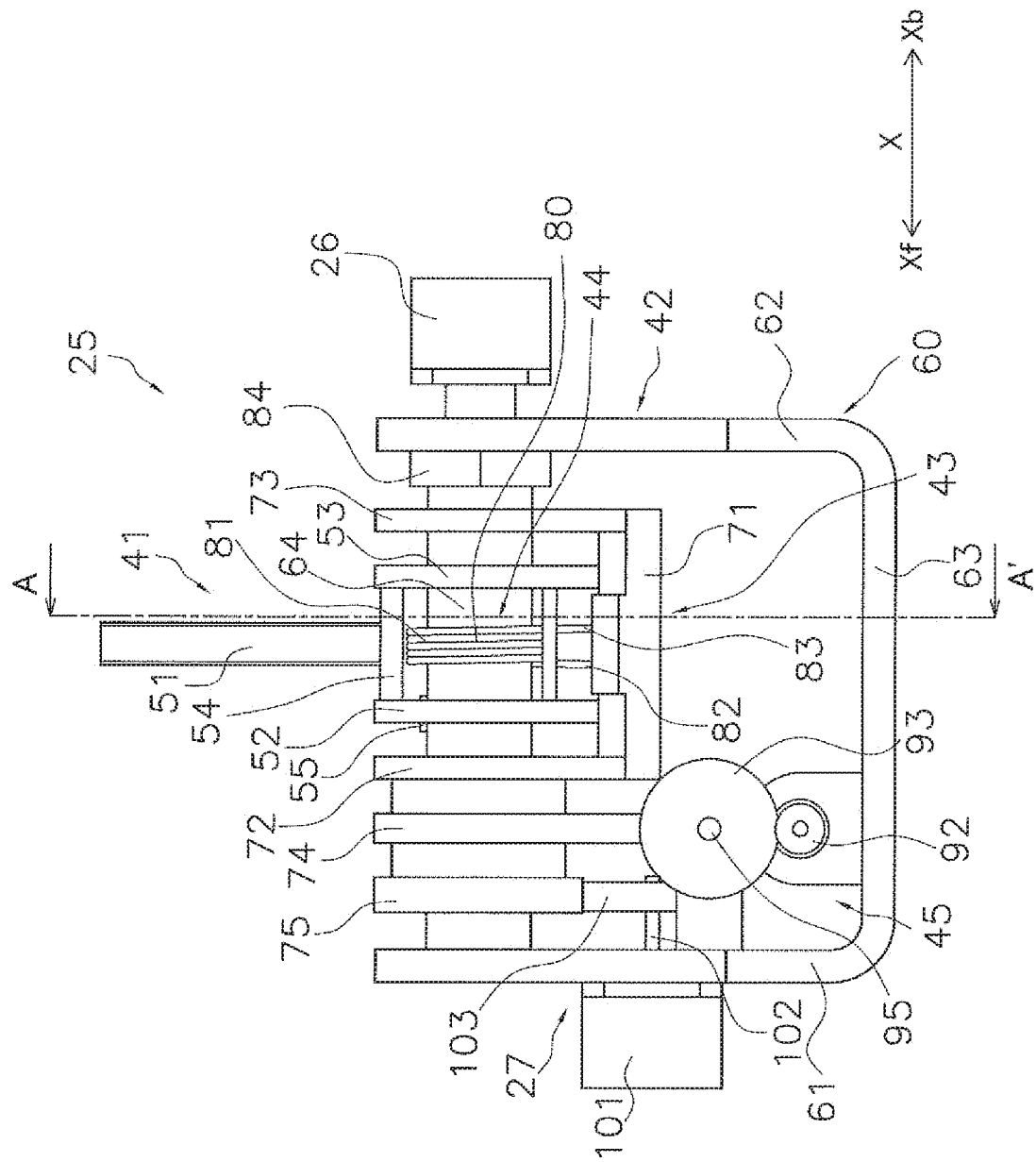
FIG. 4B is a side view illustrating the operating unit of FIG. 4A.
Figure 4C:
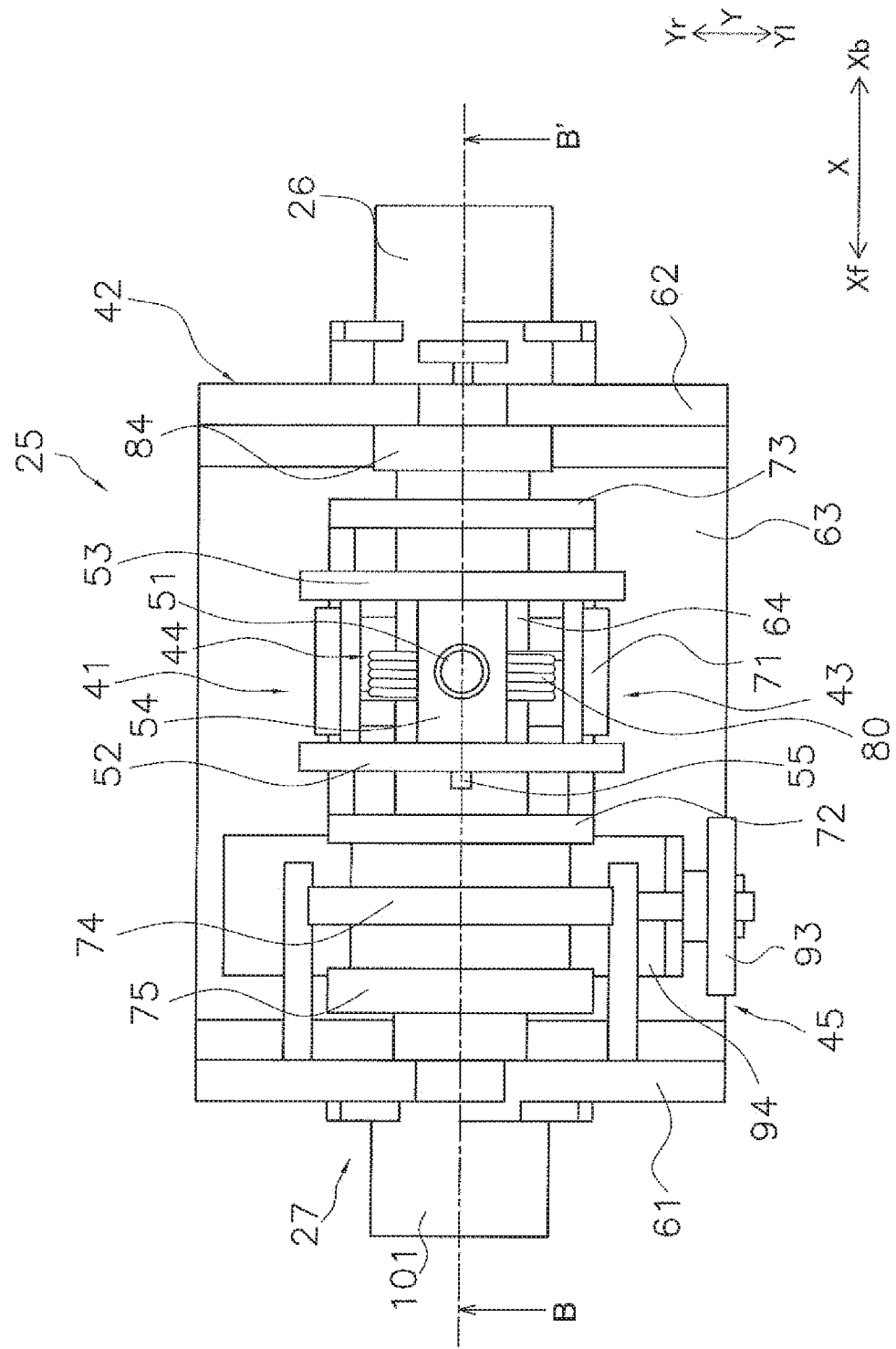
FIG. 4C is a plan view illustrating the operating unit of FIG. 4A.
Figure 4D:
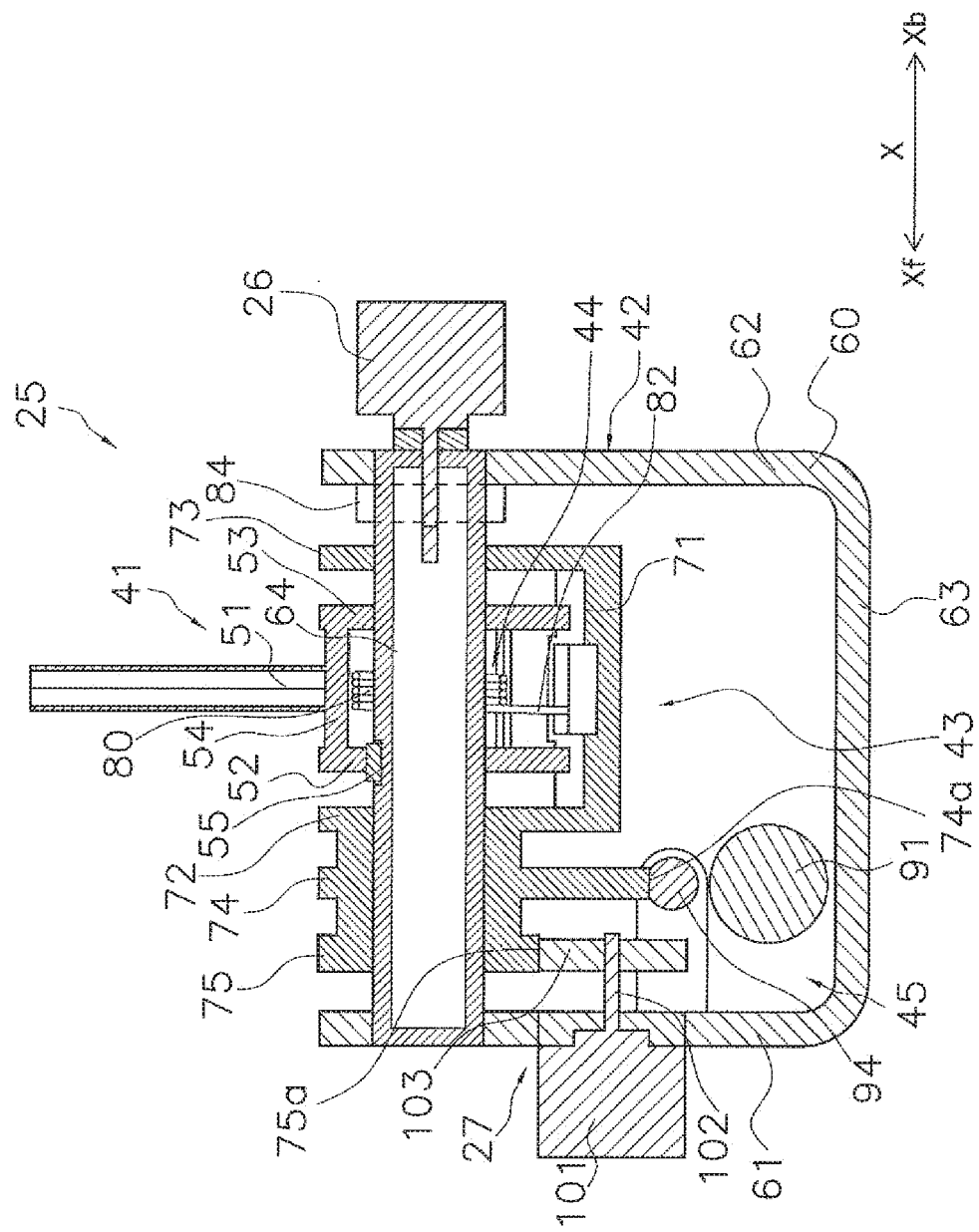
FIG. 4D is a reference arrow cross-sectional view along line B to B' in FIG. 4C.
Figure 4E:
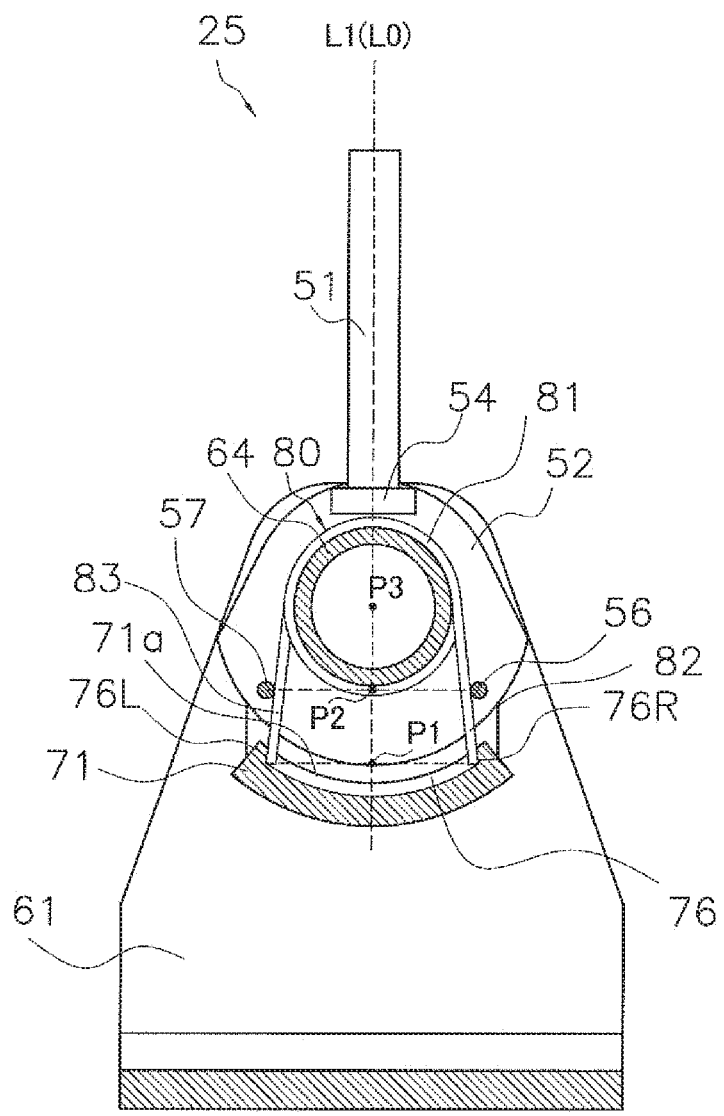
FIG. 4E is a reference arrow cross-sectional view along line A to A' in FIG. 4B.

FIG. 4A is a perspective view of the operating unit 25. FIG. 4B is a side view of the operating unit 25. FIG. 4C is a plan view of the operating unit 25. FIG. 4D is a reference arrow cross-sectional view along line B to B' in FIG. 4C. FIG. 4E is a reference arrow cross-sectional view along line A to A' in FIG. 4B. The configuration of the position adjustment unit 46 and the like is omitted in FIG. 4E and in the following FIGS. 10A to 10C, 14E, and 14F.

As illustrated in FIG. 4A, the operating unit 25 is provided with the lever unit 41, a support part 42, a base part 43, a biasing part 44, and a position adjusting part 45.

The lever unit 41 is operated by an operator. The support part 42 is fixed to the console box 20 and rotatably supports the joystick lever 51. The base part 43 is rotatably supported by the support part 42. The biasing part 44 biases the lever unit 41 to a predetermined position with respect to the base part 43. The position adjusting part 45 adjusts the rotating position of the base part 43 on the basis of the detection value θs_detect of the vehicle body frame angle.

(a. Lever Unit 41)

As illustrated in FIG. 2, the lever unit 41 is arranged at a front end part of the console box 20.

As illustrated in FIG. 4B, the lever unit 41 has the joystick lever 51, a pair of coupling plates 52 and 53, a connecting part 54, and a key 55 (see FIG. 4D).

The joystick lever 51 is a rod-like member and is operated by the operator. The pair of coupling plates 52 and 53 are coupled to the joystick lever 51 and a rotating shaft 64 (described below) of the support part 42, and transmit the rotation of the joystick lever 51 to the rotating shaft 64.

Each of the pair of coupling plates 52, 53 is arranged such that the plate-like main surface is substantially perpendicular to the front-back direction X. The pair of coupling plates 52 and 53 are arranged facing each other with a predetermined interval opened therebetween in the front-back direction X.

The connecting part 54 is arranged between the pair of coupling plates 52 and 53 so as to join the upper end parts of the pair of coupling plates 52 and 53. The lower end of the joystick lever 51 is fixed to the upper surface of the connecting part 54. The pair of coupling plates 52 and 53 have through-holes respectively formed therein and the rotating shaft 64 is inserted into the through-holes of the coupling plates 52 and 53. As illustrated in FIG. 4D, the key 55 is fitted between a recessed part formed at the edge of the through-hole of the coupling plate 52 and a groove formed in the rotating shaft 64, and is a member for transmitting the rotation of the coupling plate 52 to the rotating shaft 64. The rotating shaft 64 is rotatably supported by the support part 42.

As illustrated in FIG. 4A and FIG. 4E, rod-like connecting members 56 and 57 are provided that join the coupling plates 52 and 53. The connecting member 56 and the connecting member 57 are arranged below a center P3 of the rotating shaft 64 and further to the outside of rotating shaft 64 in the vehicle width direction. The connecting member 56 is arranged further to the right direction Yr side of the rotating shaft 64 in the vehicle width direction Y, and the connecting member 57 is arranged further to the left direction Yl side of the rotating shaft 64 in the vehicle width direction Y.

Figure 10A:
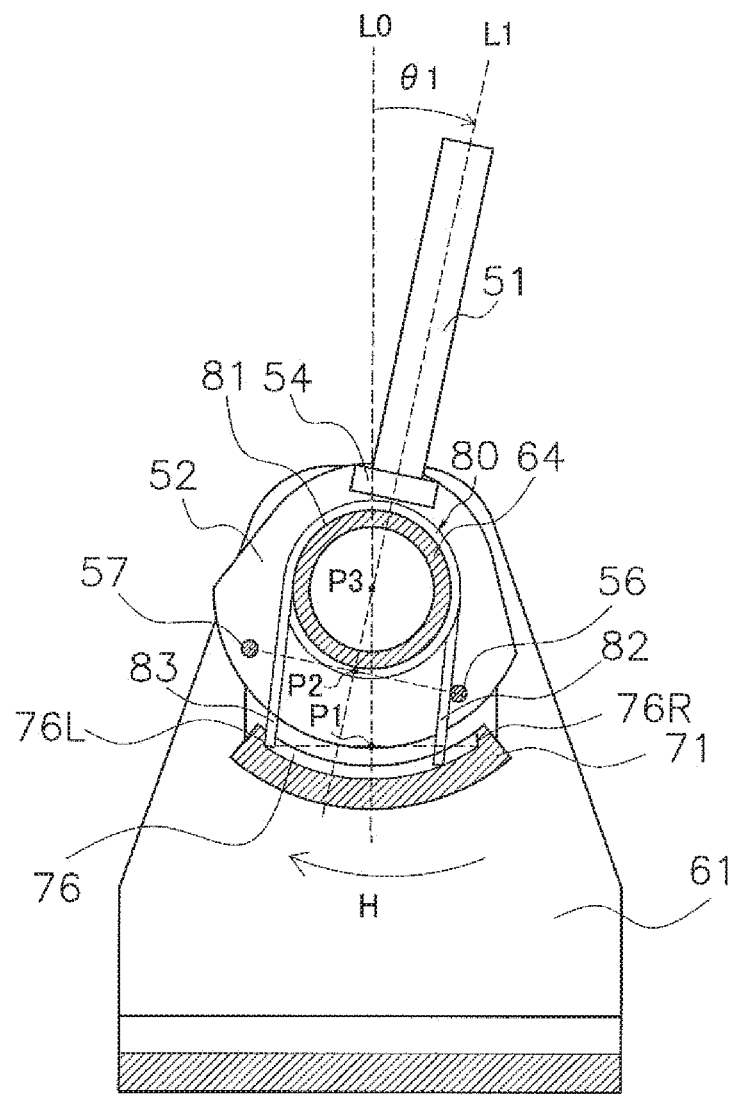
FIG. 10A is a diagram for explaining the control actions of the wheel loader of FIG. 1.

As illustrated in FIG. 10A below, when the joystick lever 51 is rotated by the operator, the pair of coupling plates 52 and 53 rotate with the connecting part 54 and the rotating shaft 64 rotates by means of the key 55.

(b. Support Part 42)

The support part 42 rotatably supports the lever unit 41. The support part 42 is fixed, for example, to the inside of the console box 20 illustrated in FIG. 2. As illustrated in FIG. 4A, the support part 42 has a support frame 60 and the rotating shaft 64.

As illustrated in FIG. 4B and FIG. 4D, the support frame 60 is a member formed in a U-shape in a side surface view. The support frame 60 has a pair of shaft support parts 61 and 62 that face each other in the front-back direction X, and a coupling part 63 that joins the lower ends of the shaft support part 61 and the shaft support part 62. The shaft support part 61 and the shaft support part 62 each have through-holes formed therein in the front-back direction X.

The rotating shaft 64 is rotatably inserted into the through-holes formed in the shaft support parts 61 and 62. The rotating shaft 64 is arranged along the front-back direction X in a substantially horizontal direction.

(c. Base Part 43)

The base part 43 is rotatably supported by the support part 42. As illustrated in FIG. 4A, the base part 43 has a base plate 71, a pair of support plates 72 and 73, a transmission gear part 74, and a detection gear part 75.

The base plate 71 corresponds to an example of a rotating part and is a plate-like member disposed so as to cover the pair of coupling plates 52 and 53 from below. The base plate 71 is curved so as to protrude downward when seen along the front-back direction X (see FIG. 4E).

As illustrated in FIG. 4B and FIG. 4C, the pair of support plates 72 and 73 rotatably support the base plate 71 on the rotating shaft 64. The pair of support plates 72 and 73 are arranged so as to sandwich the coupling plates 52 and 53 from the outside in the front-back direction X. The support plate 72 is arranged on the forward direction Xf side of the coupling plate 52 and the support plate 73 is arranged on the rearward direction Xb side of the coupling plate 53.

The support plates 72 and 73 have through-holes formed therein in the front-back direction X, and the rotating shaft 64 is inserted into the through-holes. In this way, the support plates 72 and 73 are rotatably arranged with respect to the rotating shaft 64.

As illustrated in FIG. 4A and FIG. 4E, the lower ends of the support plates 72 and 73 are curved so as to protrude downward and the base plate 71 is arranged so as to join the lower end of the support plate 72 and the lower end of the support plate 73. As illustrated in FIG. 4E, an upper surface 71a of the base plate 71 has a groove 76 formed therein in the width direction Y. The end on the right direction Yr side in the width direction Y of the groove 76 is represented by 76R, and the end on the left direction Yl side is represented by 76L.

The transmission gear part 74 transmits the driving power of the position adjusting part 45 to the base plate 71. As illustrated in FIG. 4D, the transmission gear part 74 is arranged on the front side of the support plate 72 and is coupled to the support plate 72. The transmission gear part 74 has a through-hole formed therein in the front-back direction X, and the rotating shaft 64 is inserted into the through-hole. As a result, the transmission gear part 74 is configured so as to be able to rotate with respect to the rotating shaft 64. As illustrated in FIG. 4A, a lower end surface 74a of the transmission gear part 74 is formed so as to be curved and protrude downward and a gear shape is formed on the lower end surface 74a. As illustrated in FIG. 4D, the lower end surface 74a engages with a worm gear 94 of the below mentioned position adjusting part 45.

The detection gear part 75 is used for detecting the position of the base plate 71. As illustrated in FIG. 4D, the detection gear part 75 is arranged on the forward direction Xf side of the transmission gear part 74 and is coupled to the transmission gear part 74. The detection gear part 75 has a through-hole formed therein in the front-back direction X, and the rotating shaft 64 is inserted into the through-hole. As a result, the detection gear part 75 is configured so as to be able to rotate with respect to the rotating shaft 64. A lower end surface 75a of the detection gear part 75 is formed so as to be curved and protrude downward and a gear shape is formed on the lower end surface 75a. As illustrated in FIG. 4D, the lower end surface 75a engages with a gear 103 coupled to the below mentioned base plate angle sensor 101.

Figure 10B:
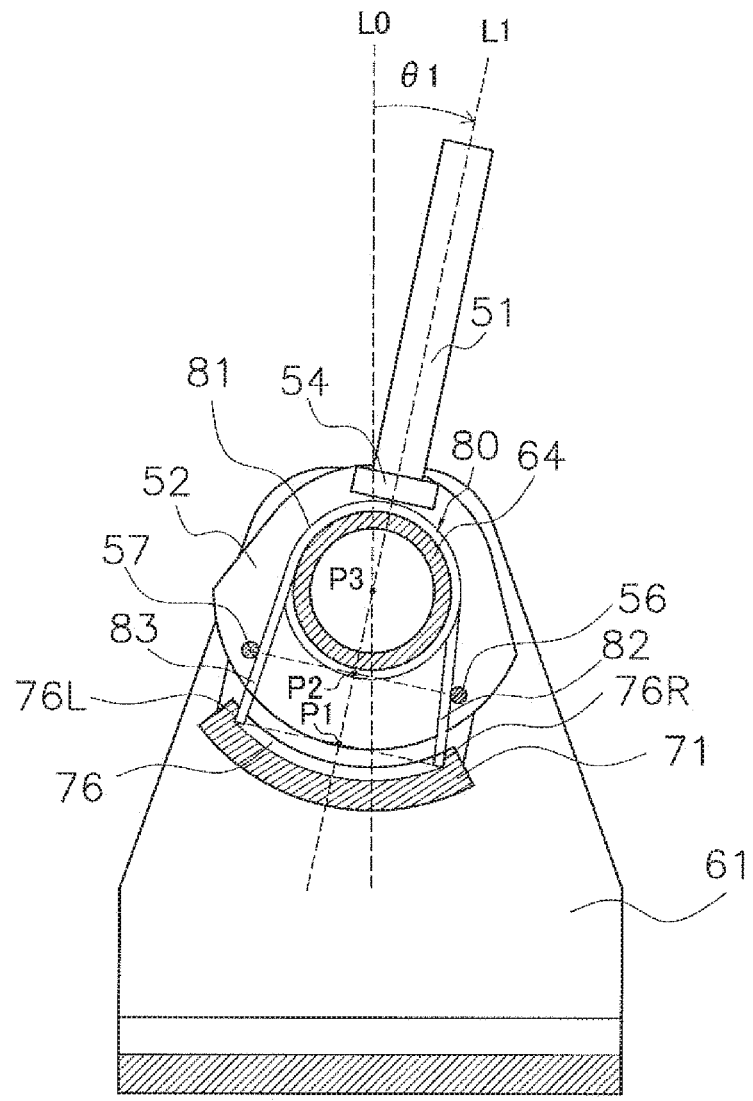
FIG. 10B is a diagram for explaining the control actions of the wheel loader of FIG. 1.

The base part 43 is able to rotate with respect to the rotating shaft 64 due to the driving power of the position adjusting part 45 (see FIG. 3 and FIG. 10B below). When the transmission gear part 74 rotates with respect to the support part 42 due to the driving power of the position adjusting part 45, the support plates 72 and 73 and the base plate 71 coupled to the transmission gear part 74 also rotate. At this time, the detection gear part 75 coupled to the transmission gear part 74 rotates and the rotation position of the base plate 71 is detected by the base plate angle sensor 101 via the detection gear part 75.

(d. Biasing Part 44)

The biasing part 44 biases the lever unit 41 to a predetermined position with respect to the base plate 71. Specifically as illustrated in FIG. 4E. the biasing part 44 biases the lever unit 41 so that the joystick lever 51 is positioned in the center of the base plate 71 in the width direction Y.

More specifically as illustrated in FIG. 4E, the predetermined position is the position where a straight line L1 that passes through the center of the joystick lever 51 passes through a center position P1 between the right end 76R and the left end 76L of the groove 76 in the base plate 71. The straight line L1 is also a straight line that passes through a center position P2 between the connecting member 56 and the connecting member 57 of the lever unit 41 and a center position P3 of the rotating shaft 64.

The biasing part 44 has a spring member 80 and a damper 84. The spring member 80 is a coil spring and, as illustrated in FIG. 4A, is arranged on the circumference of the rotating shaft 64.

Consequently, a counterforce can be produced when the operator operates the joystick lever 51 toward the left or right from the predetermined position with respect to the base plate 71, and an operational feel can be imparted to the operator.

The rotating shaft 64 is inserted into the spring member 80. The spring member 80 is arranged between the pair of the coupling plate 52 and the coupling plate 53.

As illustrated in FIG. 4E, the spring member 80 has a coil part 81, a first end part 82, and a second end part 83. The rotating shaft 64 is inserted through the coil part 81. The first end part 82 and the second end part 83 extend downward from the coil part 81 and are arranged between the connecting member 56 and the connecting member 57.

While the joystick lever 51 is arranged in the predetermined position, the first end part 82 is arranged in a state of being in contact with the connecting member 56 on the left direction Yl side of the connecting member 56. In addition, the lower end of the first end part 82 is in contact with the right end 76R of the groove 76. The second end part 83 is arranged in a state of being in contact with the connecting member 57 on the right direction Yr side of the connecting member 57. In addition, the lower end of the second end part 83 is in contact with the left end 76L of the groove 76.

The spring member 80 exerts an elastic force so as to push the connecting member 56 and the right end 76R to the right direction Yr side and push the connecting member 57 and the left end 76L to the left direction Yl side.

The counterforce produced in the joystick lever 51 by the spring member 80 will be explained. The counterforce is produced by the spring member 80 in response to the rotation angle of the joystick lever 51 with respect to the base plate 71.

The rotation angle from the center position of the joystick lever 51 with respect to the support part 42 is set as an actual lever angle θi_real and the rotation angle from the center position of the base plate 71 with respect to the support part 42 is set as an actual base plate angle θb_real. The center position of the joystick lever 51 with respect to the support part 42 is the position where the straight line L1 along the longitudinal direction of the joystick lever 51 as illustrated in FIG. 4E matches a straight line L0 arranged in the vertical direction passing through the center P3 of the rotating shaft 64. The angle when the joystick lever 51 is rotated rightward from the center position is a positive value and the angle when the joystick lever 51 is rotated leftward from the center position is a negative value.

In addition, the center position of the base plate 71 with respect to the support part 42 is the position where the center position P1 between the right end 76R and the left end 76L of the groove 76 of the base plate 71 is arranged on the straight line L0. The angle when the base plate 71 is rotated rightward from the center position is a positive value and the angle when the base plate 71 is rotated leftward from the center position is a negative value.

For example, as illustrated in the below mentioned FIG. 10A, when the joystick lever 51 is rotated rightward, a first end part 82 of the spring member 80 is pushed by the connecting member 56 to move in the clockwise direction (to the left direction Yl side) and the tip end of the first end part 82 moves away from the right end 76R of the groove 76 toward the left direction Yl side. In addition, because the tip end of the second end part 83 is in contact with the left end 76L of the groove 76, the second end part 83 does not move in the clockwise direction (toward the left direction Yl side) and the connecting member 57 moves away from the second end part 83 in the left direction Yl. As a result, the first end part 82 of the spring member 80 biases the connecting member 56 so as to push the connecting member 56 in the anticlockwise direction, whereby the spring member 80 biases the joystick lever 51 to return to the straight line L0 that passes through the center P3 of the rotating shaft 64.

Figure 5:
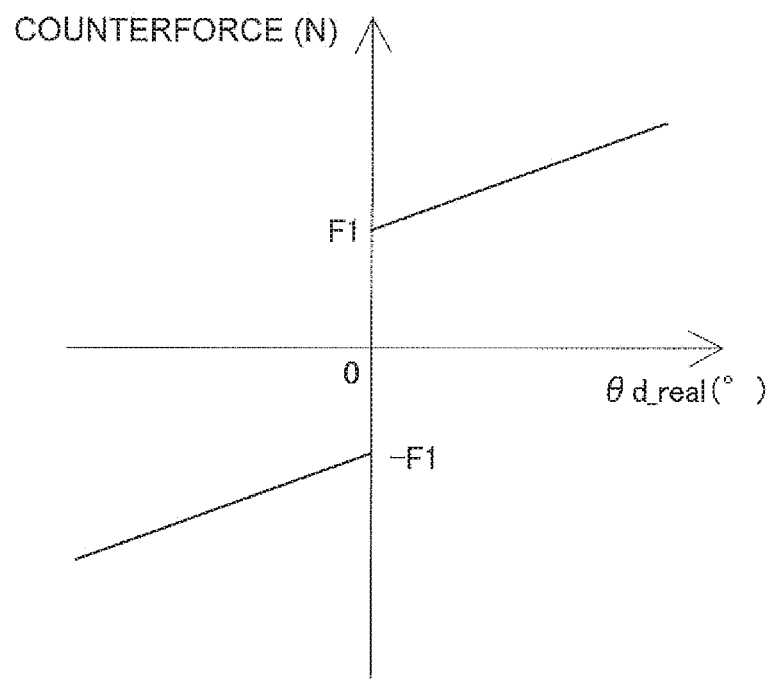
FIG. 5 illustrates a counterforce of a spring member with respect to the difference between a lever angle and a base plate angle.

FIG. 5 illustrates the relationship of the counterforces produced by the spring member 80 with an actual lever relative angle θd_real derived by subtracting the actual base plate angle θb_real from the actual lever angle θi_real. The spring member 80 demonstrates the counterforce characteristics illustrated in FIG. 5. In FIG. 5, a θd_real positive value represents a case when the joystick lever 51 is rotated rightward with respect to the base plate 71, and a θd_real negative value represents a case when the joystick lever 51 is rotated leftward with respect to the base plate 71. In addition, the counterforce as a positive value represents a counterforce produced toward the left and the counterforce as a negative value represents a counterforce produced toward the right.

While the θd_real is a positive value, the counterforce with θd_real has a proportional relationship, the initial counterforce is F1, and the value of the counterforce increases in correspondence to the value of the θd_real increasing. While the θd_real is a negative value, the initial counterforce is −F1, and the value of the counterforce decreases in correspondence to the value of the θd_real decreasing. That is, the spring characteristics of the spring member 80 have a linear shape and the counterforce with respect to a rotation operation of the joystick lever 51 increases in correspondence to the absolute value of θd_real increasing.

In this way, the joystick lever 51 rotates with respect to the base plate 71 and the counterforce increases in correspondence to the absolute value of θd_real increasing due to a force that is equal to or greater than the initial counterforce F1 being applied to the joystick lever 51.

The damper 84 is provided between the rotating shaft 64 and the shaft support part 62. Resistance is produced in correspondence to the angular speed of the joystick lever 51 by the damper 84.

(e. Position Adjusting Part 45)

The position adjusting part 45 adjusts the position of the base plate 71 on the basis of a detection value of the vehicle body frame angle sensor 24. As illustrated in FIG. 4A and FIG. 4B, the position adjusting part 45 is arranged on the upper surface of the coupling part 63 and has an electric motor 91, an output gear 92, a speed reduction gear 93, and the worm gear 94.

The electric motor 91 corresponds to an example of an actuator and is driven by commands from the control part 28. An output shaft of the electric motor 91 is arranged along the vehicle width direction Y. The output gear 92 is fixed to the output shaft of the electric motor 91. The speed reduction gear 93 is arranged on the upper side of the output gear 92 and engages with the output gear 92. The speed reduction gear 93 has a diameter greater than that of the output gear 92 and reduces the speed of the rotation of the electric motor 91. The worm gear 94 is arranged along the vehicle width direction Y on a rotating shaft 95 to which the speed reduction gear 93 is fixed. As illustrated in FIG. 4D, the worm gear 94 engages with the lower end surface 74a of the transmission gear part 74. The speed reduction gear 93 and the worm gear 94 correspond to an example of a speed reducing part.

Due to the above configuration, the output gear 92 rotates and the speed reduction gear 93 rotates due to the driving of the electric motor 91. The worm gear 94 rotates via the rotating shaft 95 due to the rotation of the speed reduction gear 93, the transmission gear part 74 rotates around the rotating shaft 64, and the base plate 71 rotates.

(1-2-5. Lever Absolute Angle Sensor 26)

The lever absolute angle sensor 26 is configured, for example, as a potentiometer and detects the actual lever angle θi_real, which is the rotation angle of the rotating shaft 64 with respect to the support part 42 (which specifically may also be referred to as the support frame 60), as a detection value θi_detect of the lever angle. As illustrated in FIG. 4D, the lever absolute angle sensor 26 is arranged on the outside (rearward direction Xb side) of the shaft support part 62 of the support part 42.

The detection value θi_detect of the lever angle detected by the lever absolute angle sensor 26 is sent to the control part 28 as a detection signal.

(1-2-6. Base Plate Angle Detecting Unit 27)

As illustrated in FIG. 4D, the base plate angle detecting unit 27 has the base plate angle sensor 101, a detecting shaft 102, and a gear 103.

The base plate angle sensor 101 is configured, for example, as a potentiometer and detects the actual base plate angle θb_real, which is the rotation angle of the base plate 71 with respect to the support part 42 (which specifically may also be the support frame 60), as a detection value θb_detect of the base plate angle. The base plate angle sensor 101 is fixed to the outside of the shaft support part 61.

The detecting shaft 102 is a shaft the rotation angle of which is detected by the base plate angle sensor 101. The detecting shaft 102 passes through the shaft support part 61 from the base plate angle sensor 101 and extends inside the shaft support part 61.

The gear 103 is fixed to the detecting shaft 102. The gear 103 engages with the lower end surface 75a of the detection gear part 75 of the base part 43.

When the base part 43 rotates due to the position adjusting part 45, the detection gear part 75 similarly rotates whereby the detecting shaft 102 also rotates via the gear 103. The rotation of the detecting shaft 102 is detected by the base plate angle sensor 101 and the rotation angle of the base plate 71 with respect to the support part 42 is detected.

The detection value θb_detect of the base plate angle detected by the base plate angle sensor 101 is sent to the control part 28 as a detection signal.

(1-2-7. Control Part 28, Vehicle Speed Sensor 29)

The control part 28 has a CPU and a memory and the like and executes the functions explained below. As illustrated in FIG. 3, the control part 28 has a motor drive control part 110 and a steering control part 120. The vehicle speed sensor 29 detects a vehicle speed V and transmits the vehicle speed V to the control part 28 as a detection signal.

The motor drive control part 110 is an example of a position adjustment control part and adjusts the rotation angle of the base plate 71 on the basis of the detection value θs_detect of the vehicle body frame angle detected by the vehicle body frame angle sensor 24. The steering control part 120 controls the solenoid pilot valve 33 on the basis of the detection value θi_detect of the lever angle detected by the lever absolute angle sensor 26, the detection value θs_detect of the vehicle body frame angle detected by the vehicle body frame angle sensor 24, and the vehicle speed V, and changes the actual vehicle body frame angle θs_real.

(a. Motor Drive Control Part 110)

The motor drive control part 110 controls the electric motor 91 of the position adjusting part 45 on the basis of the detection value θs_detect of the vehicle body frame angle detected by the vehicle body frame angle sensor 24.

Figure 6:
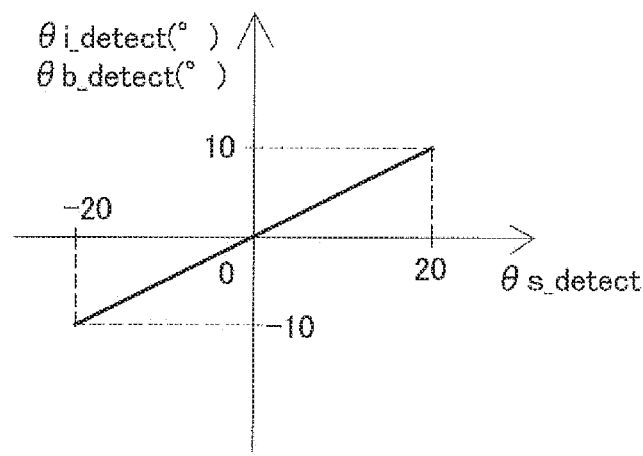
FIG. 6 illustrates the relationship between the angle scales of the base plate angle and the lever angle, and the angle scale of the steering angle.

FIG. 6 illustrates the relationship between the angle scale of the detection value θs_detect of the vehicle body frame angle and the angle scale of the detection value θb_detect (similar to the detection value θi_detect of the lever angle) of the base plate angle. As illustrated in FIG. 6, the detection value θs_detect of the vehicle body frame angle and the detection value θb_detect of the base plate angle have a proportional relationship.

The actual vehicle body frame angle θs_real can assume, for example, a width of ±40° and the actual base plate angle θb_real can assume, for example, a width of ±20°. That is, the actual vehicle body frame angle θs_real being 40° corresponds to the actual base plate angle θb_real being 20° and accordingly the relationship θb_real=0.5×θs_real is established.

Consequently as illustrated in FIG. 6, the relationship θb_detect=0.5×θs_detect is established. As a result, the motor drive control part 110 adjusts the position of the base plate 71 so as to cause the actual base plate angle θb_real to match the angle obtained by converting the detection value θs_detect of the vehicle body frame angle to the angle scale of the base plate 71. For example, if the detection value θs_detect of the vehicle body frame angle is 10°, the detection value θs_detect of the vehicle body frame angle is converted to the angle scale of the base plate 71 to arrive at 5°, and the electric motor 91 is controlled by the motor drive control part 110 so that the rotation angle of the base plate 71 becomes 5°. The detection value θs_detect of the vehicle body frame angle converted to the angle scale of the base plate 71 is written as detection value θsc_detect of the converted vehicle body frame angle.

As illustrated in FIG. 3, the motor drive control part 110 has a computing part 111, a PID control part 112, and a driver 113. The computing part 111 converts the detection value θs_detect of the vehicle body frame angle detected by the vehicle body frame angle sensor 24 to the angle scale of the base plate 71. The computing part 111 computes the difference between the detection value θsc_detect of the converted vehicle body frame angle and the detection value θb_detect of the base plate angle detected by the base plate angle sensor 101. The computing part 111 transmits the computing results to the PID control part 112.

The PID control part 112 determines a control parameter so that the detection value θb_detect of the detected base plate angle conforms to the rotation angle on the basis of the computed difference, and transmits the control parameter to the driver 113. The driver 113 controls the electric motor 91 on the basis of the received control parameter.

As a result, the rotation angle of the base plate 71 is able to conform to the actual vehicle body frame angle θs_real.

(b. Steering Control Part 120)

The steering control part 120 controls the solenoid pilot valve 33 on the basis of the detection value θi_detect of the lever angle detected by the lever absolute angle sensor 26, the detection value θs_detect of the vehicle body frame angle detected by the vehicle body frame angle sensor 24, and the vehicle speed V detected by the vehicle speed sensor 29.

FIG. 6 illustrates the relationship between the angle scale of the detection value θs_detect of the vehicle body frame angle and the angle scale of the detection value θi_detect of the lever angle. As illustrated in FIG. 6, the detection value θs_detect of the vehicle body frame angle and the detection value θi_detect of the lever angle have a proportional relationship.

The actual vehicle body frame angle θs_real is set to have, for example, a width of ±40° and the actual lever angle θi_real is set to have, for example, a width of ±20°. That is, the actual vehicle body frame angle θs_real being 40° corresponds to the actual lever angle θi_real being 20° and therefore the relationship θi_real=0.5×θs_real is established.

Consequently as illustrated in FIG. 6, the relationship θi_detect=0.5×θs_detect is established.

As a result, the steering control part 120 controls the solenoid pilot valve 33 so that the actual vehicle body frame angle θs_real is made to match the angle obtained by converting the detection value θi_detect of the lever angle to the angle scale of the vehicle body frame angle θs. For example, if the detection value θi_detect of the lever angle is 5°, the detection value θi_detect of the lever angle becomes 10° when converted to the angle scale of the detection value θs_detect of the vehicle body frame angle, whereby the steering control part 120 controls the solenoid pilot valve 33 so that the actual vehicle body frame angle θs_real becomes 10°. The detection value θi_detect of the lever angle converted to the angle scale of the detection value θs_detect of the vehicle body frame angle is written as detection value θic_detect of the converted lever angle. The detection value θic_detect of the converted lever angle corresponds to an example of the input steering angle.

The steering control part 120 has a computing part 121, a storage part 122, and an electromagnetic proportional control (EPC) command part 123. The computing part 121 converts the detection value θi_detect of the lever angle detected by the lever absolute angle sensor 26 to an angle scale of the steering angle. The computing part 121 computes the difference (also referred to as a deviation angle) between the detection value θic_detect of the converted lever angle and the detection value θs_detect of the vehicle body frame angle. The computing part 121 transmits the computed difference to the EPC command part 123. The detection value θic_detect of the converted lever angle can be said to be a target vehicle body frame angle.

The EPC command part 123 determines, on the basis of the received difference and the vehicle speed V detected by the vehicle speed sensor 29, an EPC command current from a graph stored in the storage part 122.

Figure 7:
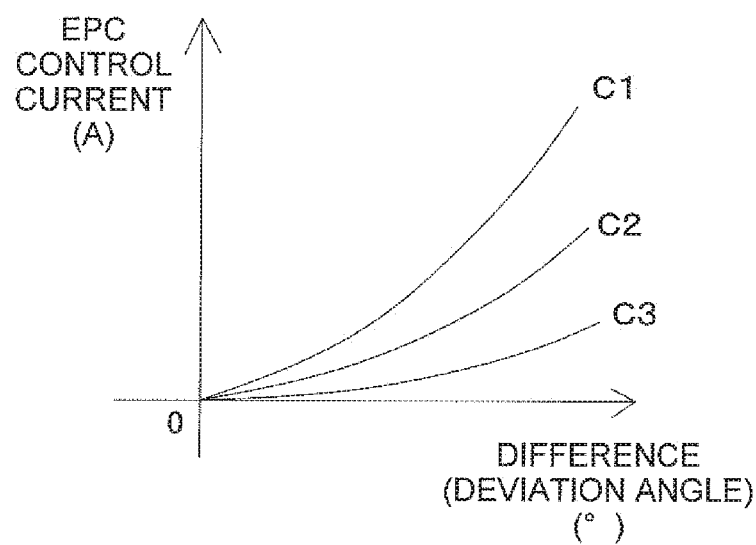
FIG. 7 illustrates a graph for determining a command current for an electronic pilot valve.

FIG. 7 illustrates a graph for determining the EPC control and is stored in the storage part 122. Curves which indicate values of the EPC control currents with respect to the deviation angle are set in the storage part 122 for a plurality of vehicle speeds. For example, in FIG. 7, a curve C1 when the vehicle speed is 10 km/h, a curve C2 when the vehicle speed is 20 km/h, and a curve C3 when the vehicle speed is 30 km/h, are set. The value of the EPC control current decreases in correspondence to an increase in the vehicle speed. As a result, when the vehicle speed increases, the speed (also referred to as angular speed) at which the actual vehicle body frame angle θs_real changes decreases and high-speed stability is improved. Additionally, when the vehicle speed decreases, the speed (also referred to as angular speed) at which the actual vehicle body frame angle θs_real changes increases and steerability during low speeds is improved. When the vehicle speed V is between C1, C2, or C3, the EPC control current is determined by an interpolation calculation.

The EPC command part 123 transmits an EPC command current determined using the data in FIG. 7 to the solenoid pilot valve 33.

While omitted in FIG. 3, the control part 28 may also control the main pump 32 and the pilot pump 34, or the like.

The transmission and reception of signals between the control part 28 and the vehicle body frame angle sensor 24, the lever absolute angle sensor 26, the base plate angle sensor 101, the vehicle speed sensor 29, the electric motor 91, and the solenoid pilot valve 33 may each be carried out wirelessly or by wire.

<2. Operations>

Figure 8:
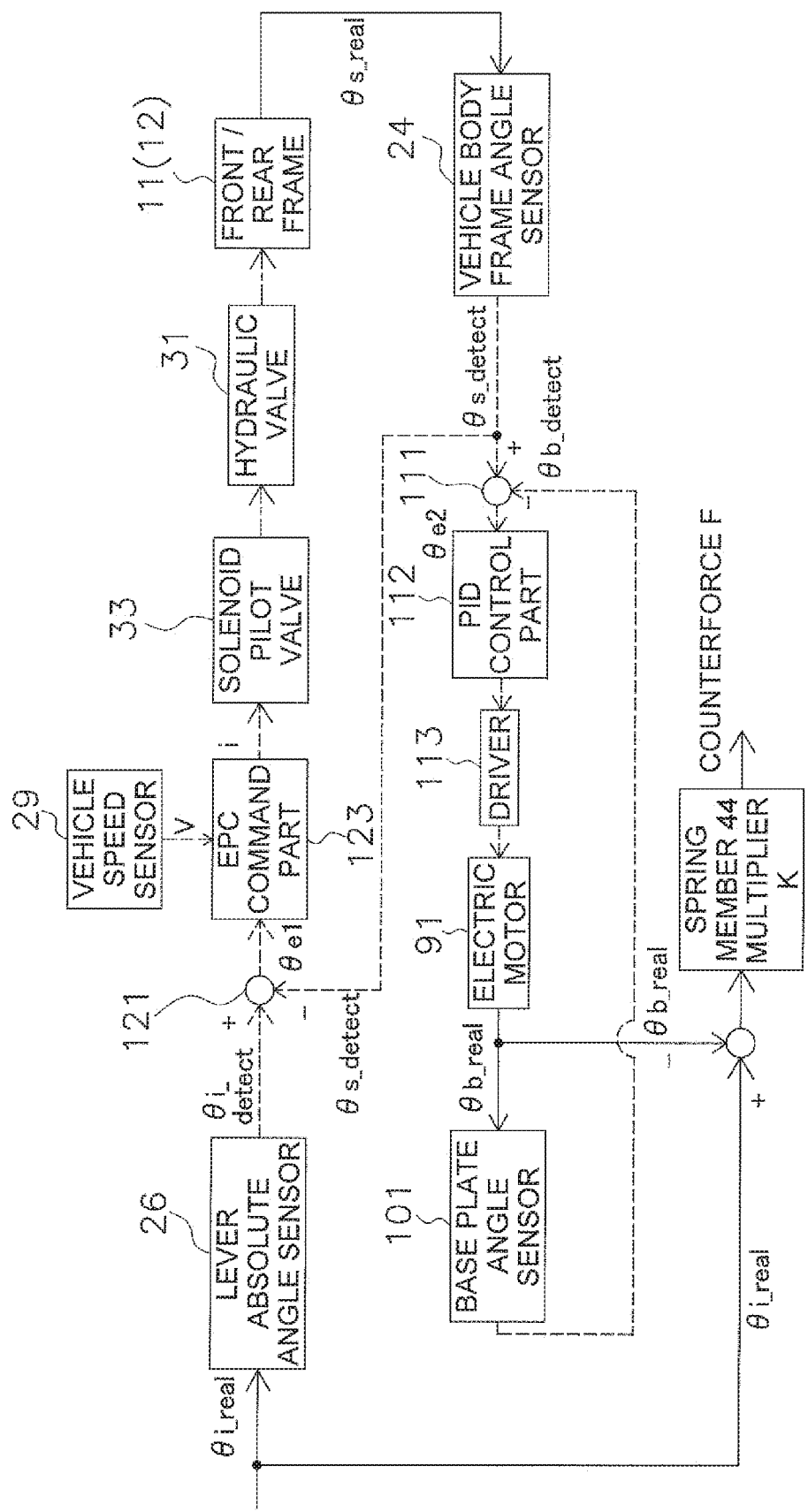
FIG. 8 is a block diagram for explaining the control actions of the wheel loader of FIG. 1.
Figure 9:
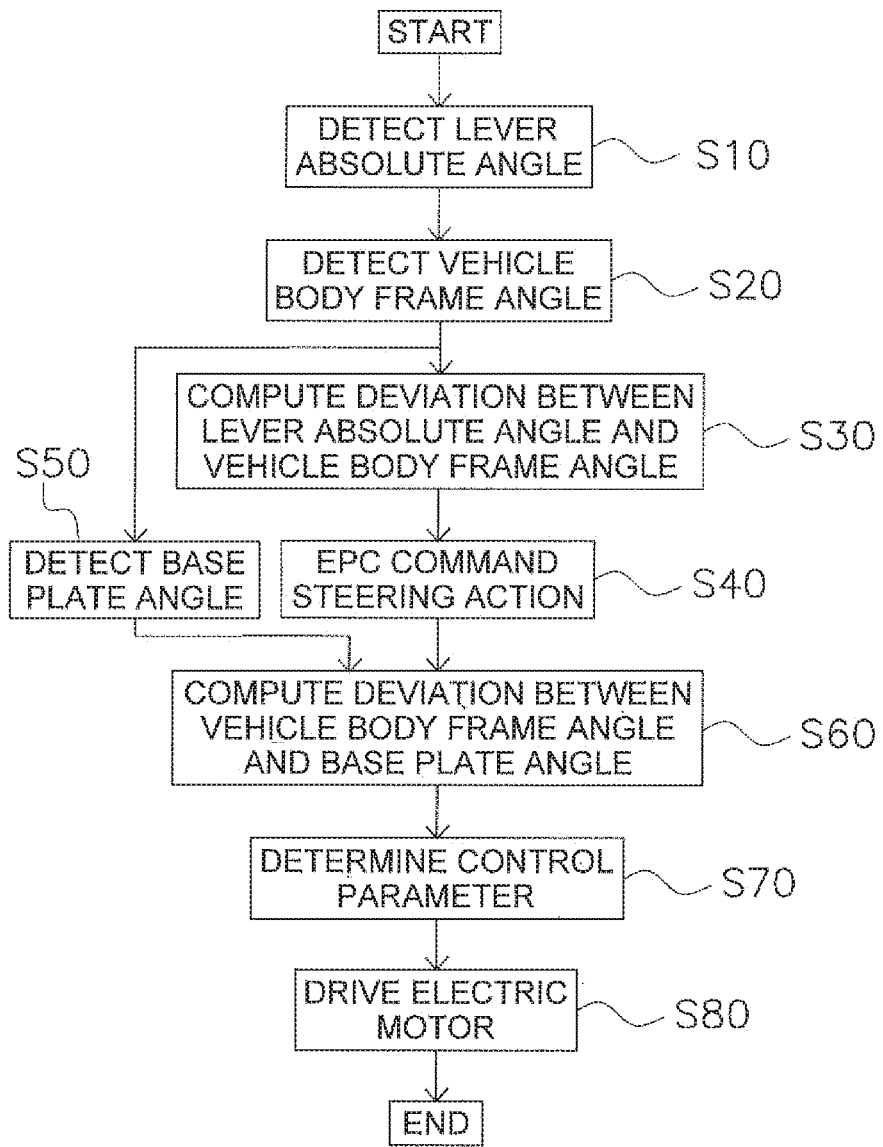
FIG. 9 is a flow chart of the control actions of the wheel loader of FIG. 1.
Figure 10C:
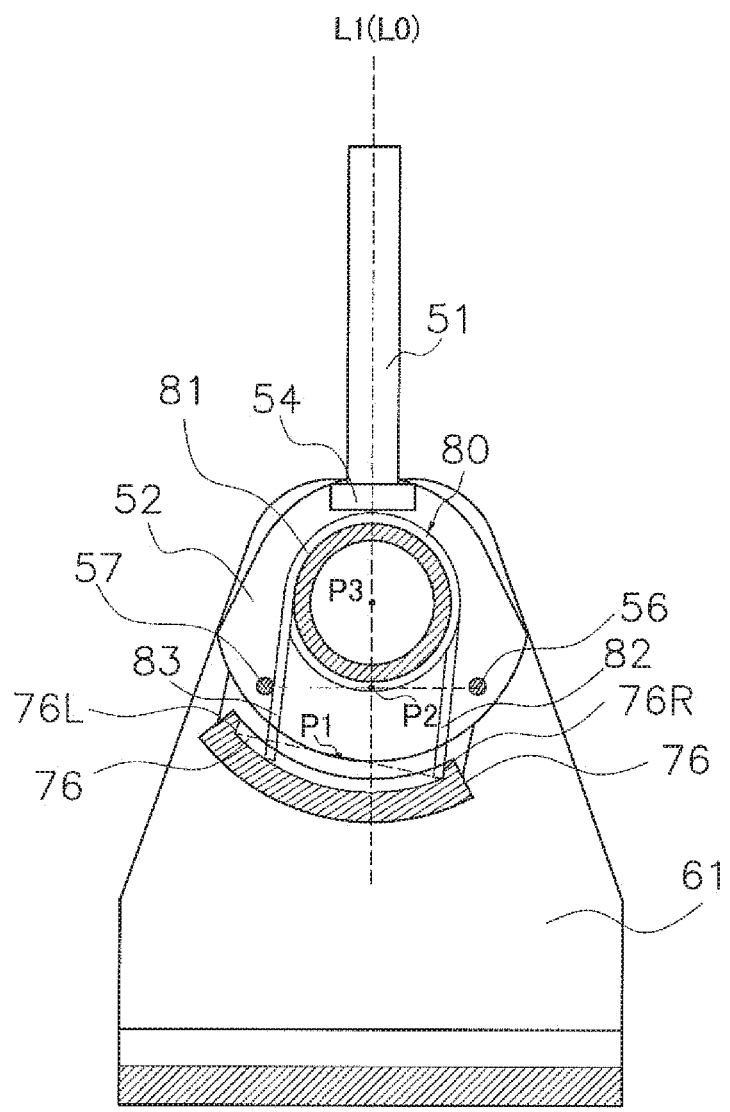
FIG. 10C is a diagram for explaining the control actions of the wheel loader of FIG. 1.

The controls actions of the wheel loader 1 of the present embodiment will be explained below. FIG. 8 is a block diagram for explaining the control actions of the wheel loader of FIG. 1. In FIG. 8, electrical actions are represented by dotted lines, mechanical actions are represented by solid lines, and actions that use hydraulic pressure are represented by one dot chain lines. FIG. 9 is a flow chart of the control actions of the wheel loader 1 of the present embodiment. FIG. 10A to 10C are cross-sectional views for explaining the control actions of the wheel loader 1 of the present embodiment.

As illustrated in FIG. 4E, when the joystick lever 51 is arranged in the vertical direction, the actual lever angle θi_real of the joystick lever 51 is zero. Because the actual vehicle body frame angle θs_real is also zero, the base plate 71 is also positioned in the predetermined initial position. The predetermined initial position is, for example, the position where the position P1 (center position between the right end 76R and the left end 76L of the groove 76) in the base plate 71 is arranged on the straight line L1 that passes through the center of the joystick lever 51 as illustrated in FIG. 4E.

In the present embodiment, the actual vehicle body frame angle θs_real is the angle from the state in which the actual vehicle body frame angle θs_real is zero in the front-back direction with respect to the rear frame 12 as illustrated in FIG. 3. Additionally, the actual lever angle θi_real represents the rotation angle from the center position of the joystick lever 51 as illustrated in FIG. 3. Additionally, when deriving the difference (deviation angle) for example, the rotation to the right may be computed as a plus angle and the rotation to the left may be computed as a minus angle.

At this time, the solenoid pilot valve 33 is in the neutral position. In this case, the hydraulic valve 31 is also in the neutral position. As a result, the supply and discharge of oil to and from the left and right steering cylinders 21 and 22 is not carried out and the actual vehicle body frame angle θs_real is maintained at zero.

The operator then applies an operating force Fin for rotating the joystick lever 51 from the center position to the right side as illustrated in FIG. 3. When the operating force Fin exceeds the initial biasing force of the spring member 80, the joystick lever 51 rotates to the right and the actual lever angle θi_real increases as illustrated in FIG. 10A. The counterforce imparted by the spring member 80 increases in accordance with the movement to the right.

In step S10 as illustrated in FIG. 8, the lever absolute angle sensor 26 detects the actual lever angle θi_real of the joystick lever 51 operated by the operator, as the detection value θi_detect of the lever angle.

Next in step S20, the vehicle body frame angle sensor 24 detects the actual vehicle body frame angle θs_real as the detection value θs_detect of the vehicle body frame angle.

At this time, because the reactions of the left and right steering cylinders 21 and 22 are delayed, the actual vehicle body frame angle θs_real is zero. As a result, the detection value θs_detect of the vehicle body frame angle that is the detection value detected by the vehicle body frame angle sensor 24 is zero. Because the actual vehicle body frame angle θs_real is substantially zero, the base plate 71 also does not rotate. As a result, in the state in which the joystick lever 51 is rotated to the right as illustrated in FIG. 10A, the straight line L1 (also referred to as a straight line along the joystick lever 51) that passes through the center of the joystick lever 51 has entered a state of rotating from the position P1 of the base plate 71. In addition, the first end part 82 of the spring member 80 is pushed by the connecting member 56 to move in the clockwise direction (to the left direction Y1 side) and the tip end of the first end part 82 moves away from the right end 76R of the groove 76 toward the left direction Y1 side. In addition, because the tip end of the second end part 83 is in contact with the left end 76L of the groove 76, the second end part 83 does not move in the clockwise direction (toward the left direction Y1 side) and the connecting member 57 moves away from the second end part 83 in the left direction Y1. As a result, the first end part 82 of the spring member 80 pushes the connecting member 56 in the anticlockwise direction, whereby the spring member 80 biases the joystick lever 51 to return to the straight line L0 that passes through the center P3 of the rotating shaft 64.

Next in step S30, the computing part 121 uses the graph illustrated in FIG. 6 and converts the detection value θi_detect of the detected lever angle to the angle scale of the detection value θs_detect of the vehicle body frame angle to compute the detection value θic_detect of the converted lever angle. The computing part 121 then computes the difference (deviation angle θe1) between the detection value θic_detect of the converted lever angle and the detection value θs_detect of the vehicle body frame angle. The computing part 121 transmits the computed deviation angle θe1 to the EPC command part 123.

Next in step S40, the EPC command part 123 uses the difference received from the computing part 121 and the vehicle speed V received from the vehicle speed sensor 29 to determine the EPC current from the data illustrated in FIG. 7 and stored in the storage part 122, and issues a command to the solenoid pilot valve 33.

Because the joystick lever 51 is rotated to the right, the solenoid pilot valve 33 enters the right pilot position and the pilot pressure supplied by the solenoid pilot valve 33 is supplied to the hydraulic valve 31 (see FIG. 8). Due to the supply of the pilot pressure, the hydraulic valve 31 enters the right steering position, and the main oil pressure is supplied to the steering cylinders 21 and 22 so that the steering cylinder 21 extends and the steering cylinder 22 contracts.

Consequently, the actual vehicle body frame angle θs_real gradually increases and the front frame 11 is directed to the right with respect to the rear frame 12.

The change of the actual vehicle body frame angle θs_real is reflected in the angle of the base plate 71.

Concurrent to steps S30 and S40, in step S50, the actual base plate angle θb_real is detected by the base plate angle sensor 101 as the detection value θb_detect of the base plate angle.

Next in step S60, the computing part 111 of the motor drive control part 110 uses the graph illustrated in FIG. 6 and converts the detection value θs_detect of the vehicle body frame angle to the detection value θsc_detect of the converted vehicle body frame angle which is the angle scale of the base plate 71. The computing part 111 the computes a deviation angle θe₂ (also called a difference) between the detection value θsc_detect of the converted vehicle body frame angle and the detection value θb_detect of the base plate angle detected by the base plate angle sensor 101.

Next in step S70, the PID control part 112 determines the control parameter so that the detection value θb_detect of the base plate angle matches the detection value θsc_detect of the converted vehicle body frame angle, and transmits the control parameter to the driver 113.

Next in step S80, the driver 113 drives the electric motor 91 so that the detection value θb_detect of the base plate angle matches the detection value θsc_detect of the converted vehicle body frame angle. As a result, the base plate 71 rotates in the clockwise direction (direction of arrow H) in FIG. 10A around the center P3 of the rotating shaft 64. When the base plate 71 rotates toward the rotation position of the joystick lever 51, as illustrated in FIG. 8, the deviation angle between the actual lever angle θi_real and the actual base plate angle θb_real decreases whereby the biasing force by the spring member 80 is reduced.

When the operator stops the joystick lever 51 at the predetermined actual lever angle θi_real=θ1_real, the actual vehicle body frame angle θs_real gradually increases, whereby the difference (deviation angle) of the rotation angle between the detection value θ1c_detect of the converted lever angle obtained by converting the detection value θ1_detect of the lever angle to the angle scale of the detection value θs_detect of the vehicle body frame angle, and the detection value θs_detect of the vehicle body frame angle, decreases. Then, when the actual vehicle body frame angle θs_real catches up to the detection value θ1c_detect of the converted lever angle, the difference (deviation angle) becomes zero. At this time, the solenoid pilot valve 33 is in the neutral position and the hydraulic valve 31 is also in the neutral position. As a result, the supply and discharge of oil to and from the left and right steering cylinders 21 and 22 is not carried out and the actual vehicle body frame angle θs_real is maintained at the rotation angle θ1. In addition, as illustrated in FIG. 10B, the base plate 71 also rotates in the clockwise direction by θ1, and the straight line L1 that passes through the center of the joystick lever 51 is positioned in the center of the base plate 71. Specifically, the base plate 71 is arranged at the position where the center position P1 thereof between the right end 76R and the left end 76L of the groove 76 is arranged on the straight line L1. The positional relationship of the base plate 71 and the joystick lever 51 becomes the same positional relationship depicted in FIG. 4E.

Next, when the operator returns the joystick lever 51 from the right side position (θi_real=θ1) toward the center position (θi_real=zero), as illustrated in FIG. 10C, the lever unit 41 rotates leftward so that the straight line L1 is positioned in the vertical direction.

Before the joystick lever 51 returns to the center position with respect to the support part 42 (the state illustrated in FIG. 10B), the positional relationship of the joystick lever 51 and the base plate 71 enters the same positional relationship as illustrated in FIG. 4E. As a result, when moving the joystick lever 51, the counterforce for starting the movement becomes the same counterforce for starting the movement from the initial position. That is, in the present embodiment, because the base plate 71 rotates to a position corresponding to the actual vehicle body frame angle θs_real, the counterforce imparted to the operation is determined in accordance with the state (intermediate position, right pilot position, left pilot position) of the solenoid pilot valve 33 regardless of the position of the joystick lever 51.

At this time, because the reactions of the left and right steering cylinders 21 and 22 are delayed, the actual vehicle body frame angle θs_real is θ1c. In addition, because the actual base plate angle θb_real of the base plate 71 is θ1 which is the same as the actual vehicle body frame angle θs_real, as illustrated in FIG. 10C, the second end part 83 of the spring member 80 is pushed by the connecting member 57 and moves to the anticlockwise side (right direction Yr side), whereby the second end part 83 moves away from the left end 76L of the groove 76. However, the first end part 82 of the spring member 80 pushes against the right end 76R of the groove 76. As a result, the second end part 83 of the spring member 80 pushes the connecting member 57 in the clockwise direction whereby the spring member 80 biases the lever unit 41 with respect to the base plate 71 so as to enter the state illustrated in FIG. 10B.

Because the actual vehicle body frame angle θs_real is θ1c as indicated above, the difference (=θ1c_detect−θs_detect) decreases from zero and becomes minus. The solenoid pilot valve 33 then enters the left pilot position, the pilot pressure is supplied to the hydraulic valve 31, and the hydraulic valve 31 enters the left steering position. As a result, the oil pressure is supplied so that the steering cylinder 22 extends and the steering cylinder 21 contracts.

The actual vehicle body frame angle θs_real thereby gradually decreases from the rotation angle θ1c. The change of the actual vehicle body frame angle θs_real is reflected on the base plate 71 as indicated above, and the base plate 71 also rotates in the same way as the change of the actual vehicle body frame angle θs_real.

When the actual vehicle body frame angle θs_real reaches zero, the difference with the actual lever angle θi_real (=0) also becomes zero. At this time, the solenoid pilot valve 33 is in the neutral position and the hydraulic valve 31 is also in the neutral position. As a result, the supply and discharge of oil to and from the left and right steering cylinders 21 and 22 is not carried out and the actual vehicle body frame angle θs_real is returned to zero. Consequently, the front frame 11 is returned to an orientation in the front-back direction with respect to the rear frame 12.

The base plate 71 is driven by the electric motor 91 to rotate so that the actual base plate angle θb_real becomes zero as the actual vehicle body frame angle θs_real decreases, and the base plate 71 returns to the initial position (θb_real=0) illustrated in FIG. 4E.

The case of the joystick lever 51 being rotated to the left is the same as above and is omitted.

Second Embodiment

A wheel loader of a second embodiment according to the present invention is explained hereinbelow. The wheel loader of the second embodiment has a steering operating device with a different configuration from the wheel loader 1 of the first embodiment. As a result the explanation will focus on the differences and explanations of other similar configurations will be omitted.

Figure 11:
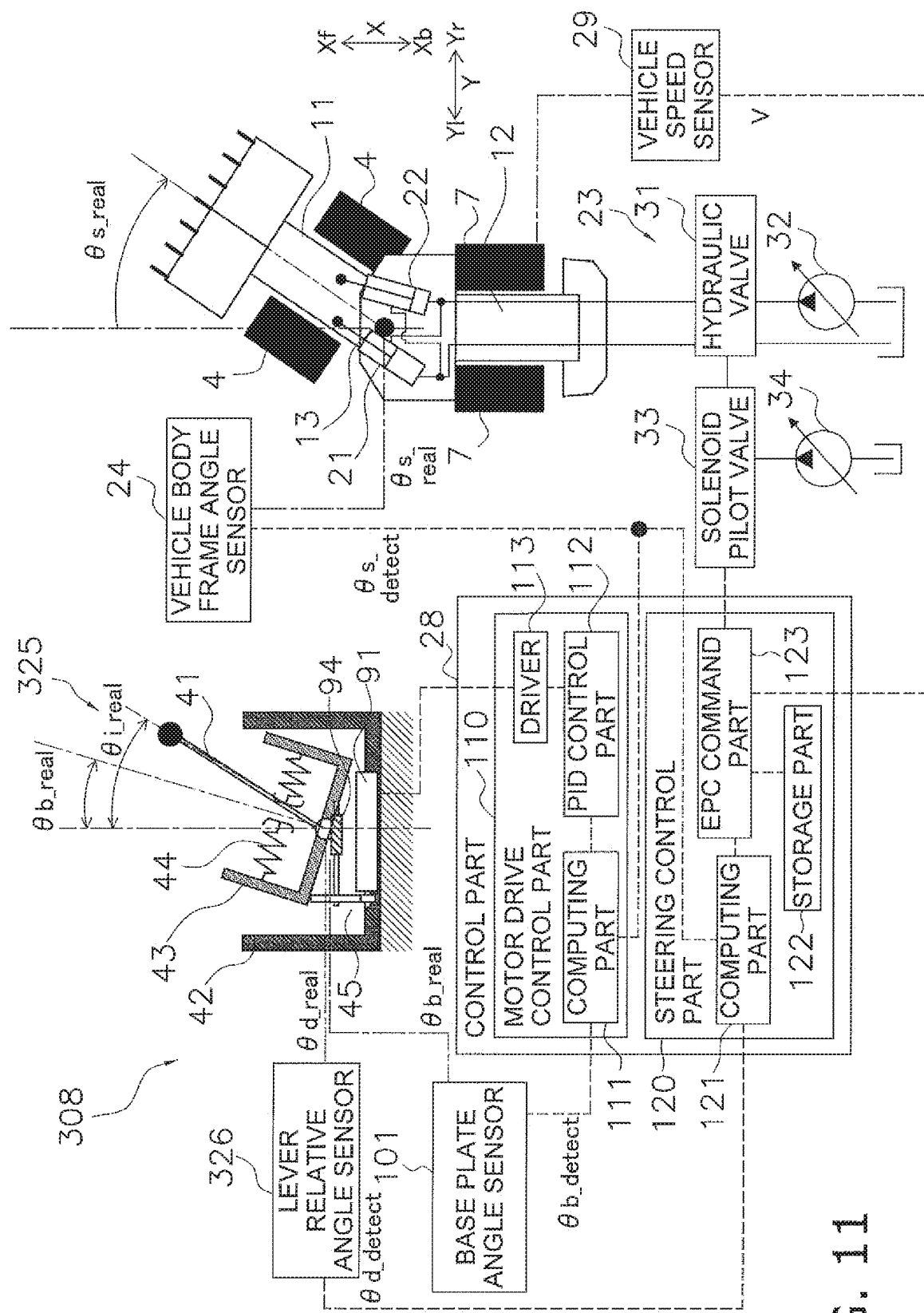
FIG. 11 is a configuration view illustrating a steering operating device of a wheel loader of a second embodiment according to the present invention.

FIG. 11 illustrates a configuration of a steering operating device 308 of the present second embodiment.

While the steering operating device 8 of the first embodiment is provided with the lever absolute angle sensor 26 that detects the rotation angle of the joystick lever 51 with respect to the support part 42, the steering operating device 308 of the second embodiment is provided with a lever relative angle sensor 326 that calculates the angle of the joystick lever 51 with respect to the base plate 71. The lever relative angle sensor 326 corresponds to an example of the second rotation angle detecting part.

Figure 12:
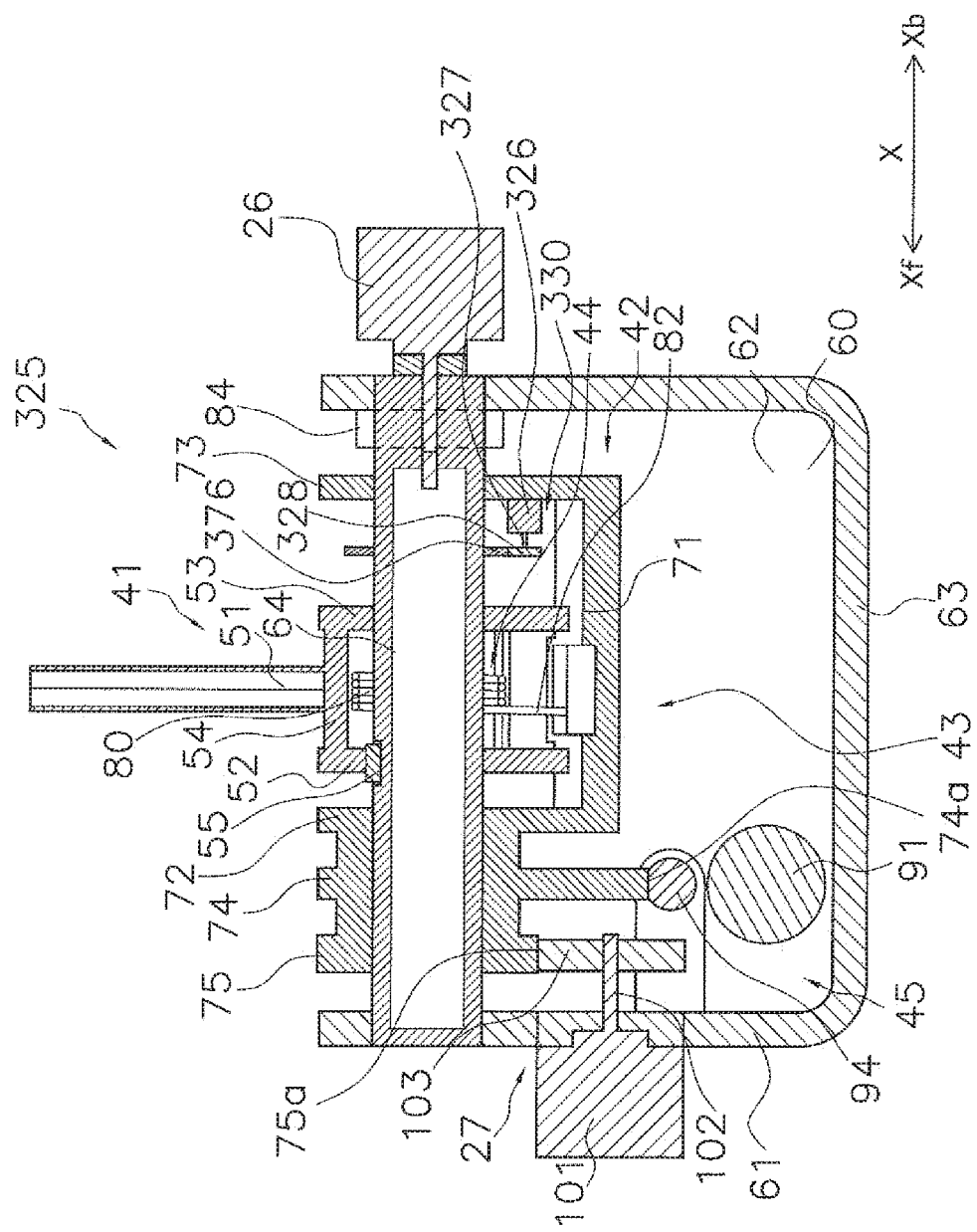
FIG. 12 is a cross-sectional view illustrating an operating unit of the wheel loader of the second embodiment according to the present invention.

FIG. 12 is a cross-sectional view illustrating an operating unit 325 of the second embodiment. The operating unit 325 illustrated in FIG. 12 is provided with a lever relative angle detecting unit 330. As illustrated in FIG. 12, the lever relative angle detecting unit 330 has the lever relative angle sensor 326, a detecting shaft 327, and a gear 328. In addition, a detecting gear 376 is fixed to the rotating shaft 64.

The lever relative angle sensor 326 is configured, for example, as a potentiometer and detects an actual lever relative angle θd_real, which is the rotation angle of the joystick lever 51 with respect to the base plate 71, as a detection value θd_detect of the lever relative angle. The lever relative angle sensor 326 is fixed to the inside (coupling plate 53 side) of the support plate 73. The detecting shaft 327 is a shaft the rotation angle of which is detected by the lever relative angle sensor 326. The detecting shaft 327 extends from the lever relative angle sensor 326 in the forward direction Xf. The gear 328 is fixed to the detecting shaft 327. The gear 328 engages with the lower end surface of the detecting gear 376 fixed to the rotating shaft 64.

When the joystick lever 51 is rotated, the rotating shaft 64 rotates and the detecting gear 376 fixed to the rotating shaft 64 also rotates. The gear 328 and the detecting shaft 327 rotate due to the rotation of the detecting gear 376 and the angle of the detecting shaft 327 is detected by the lever relative angle sensor 326. The base plate 71 is joined to the support plate 73 and the lever relative angle sensor 326 is fixed to the support plate 73. Therefore, the lever relative angle sensor 326 is able to detect the relative angle of the joystick lever 51 with respect to the base plate 71.

The detection value θd_detect of the lever relative angle detected by the lever relative angle sensor 326 corresponds to the difference between the actual lever angle θi_real of the joystick lever 51 with respect to the support part 42 and the actual base plate angle θb_real with respect to the support part 42. As a result, the detection value θd_detect of the lever relative angle detected by the lever relative angle sensor 326 is transmitted to the computing part 121. Therefore, the lever relative angle sensor 326 corresponds to an example of a relative angle detecting part for detecting the relative angle of the joystick lever 51 with respect to the base plate 71.

Figure 13:
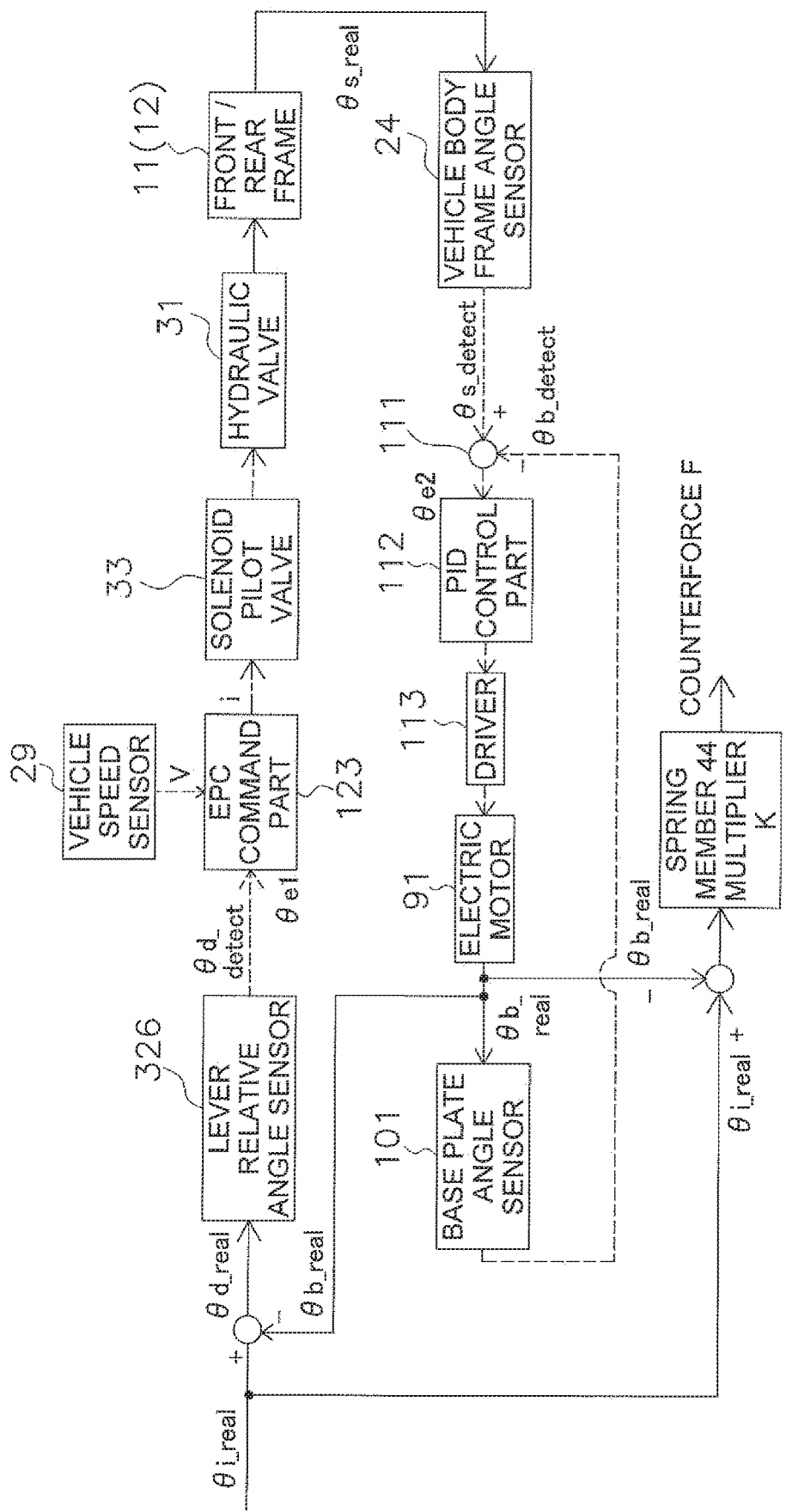
FIG. 13 is a block diagram for explaining the control actions of the wheel loader of the second embodiment according to the present invention.

FIG. 13 is a block diagram for explaining the control actions of the wheel loader 1. In the second embodiment, the detection value θd_detect of the lever relative angle detected by the lever relative angle sensor 326 corresponds to the difference (deviation angle) between the rotation angle of the joystick lever 51 with respect to the support part 42 and the rotation angle of the base plate 71 with respect to the support part 42. As illustrated in FIG. 13, the computing part 121 converts the detection value θd_detect of the lever relative angle acquired from the lever relative angle sensor 326 to the angle scale of the vehicle body frame angle, and transmits the same as θe$_1$ to the EPC command part 123.

In addition, in a control flow of the second embodiment, the detection value θd_detect of the lever relative angle is detected instead in steps S10 to S30 when using the explanation of FIG. 9.

Third Embodiment

A wheel loader 1 of a third embodiment according to the present invention is explained hereinbelow. The wheel loader of the third embodiment has a lever unit with a different configuration from the wheel loader 1 of the first embodiment. As a result the explanation will focus on the differences and explanations of other similar configurations will be omitted.

While the lever unit 41 is biased to a predetermined position with respect to the base plate 71 by the spring member 80 in the operating unit 25 of the first embodiment, in an operating unit 425 of the third embodiment, a lever unit 441 is biased to a predetermined position with respect to a base plate 471 by a biasing part 444 having a cam mechanism. The base plate 471 corresponds to an example of the rotating part.

Figure 14A:
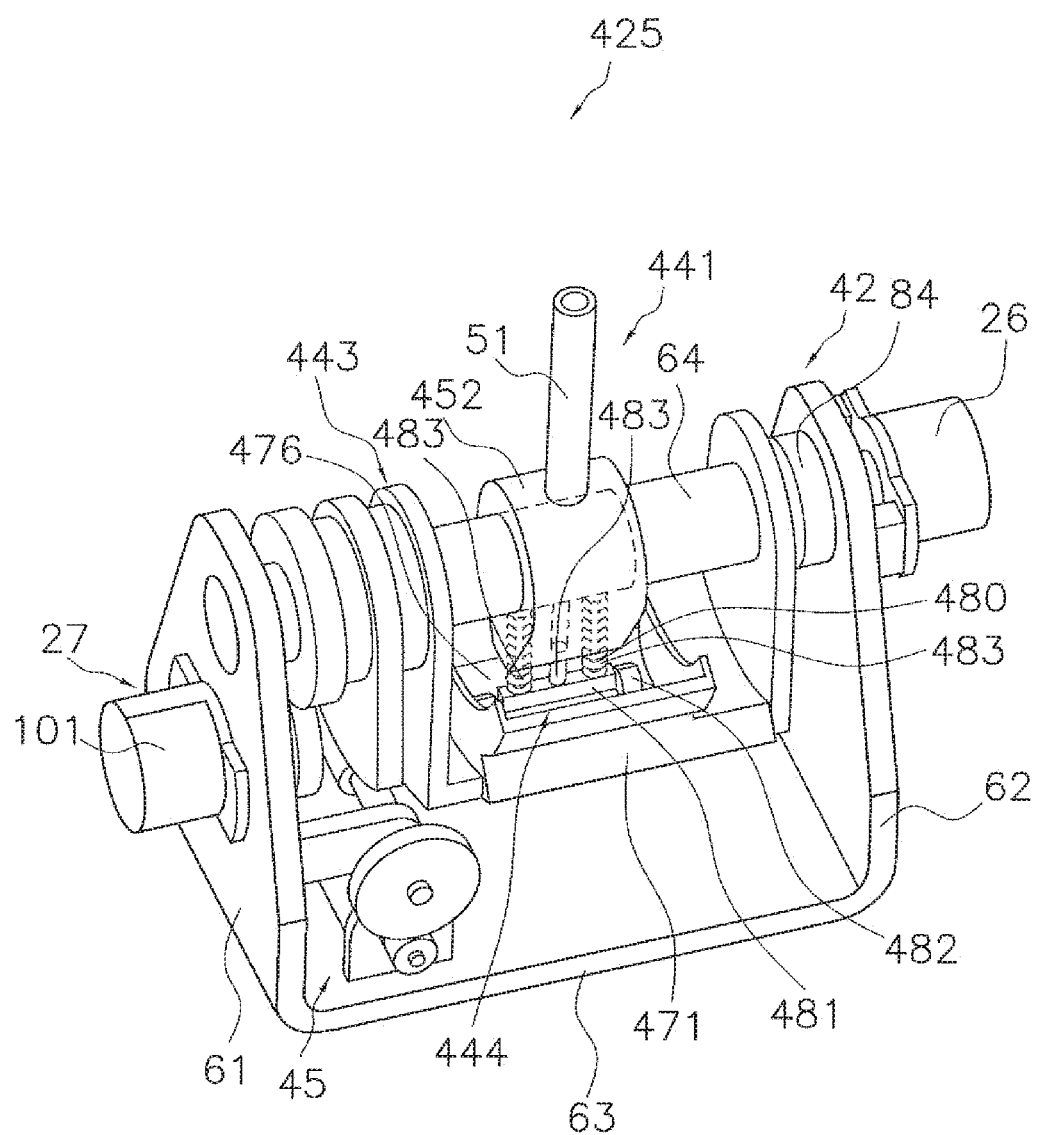
FIG. 14A is a perspective view illustrating an operating unit of a wheel loader of a third embodiment according to the present invention.
Figure 14B:
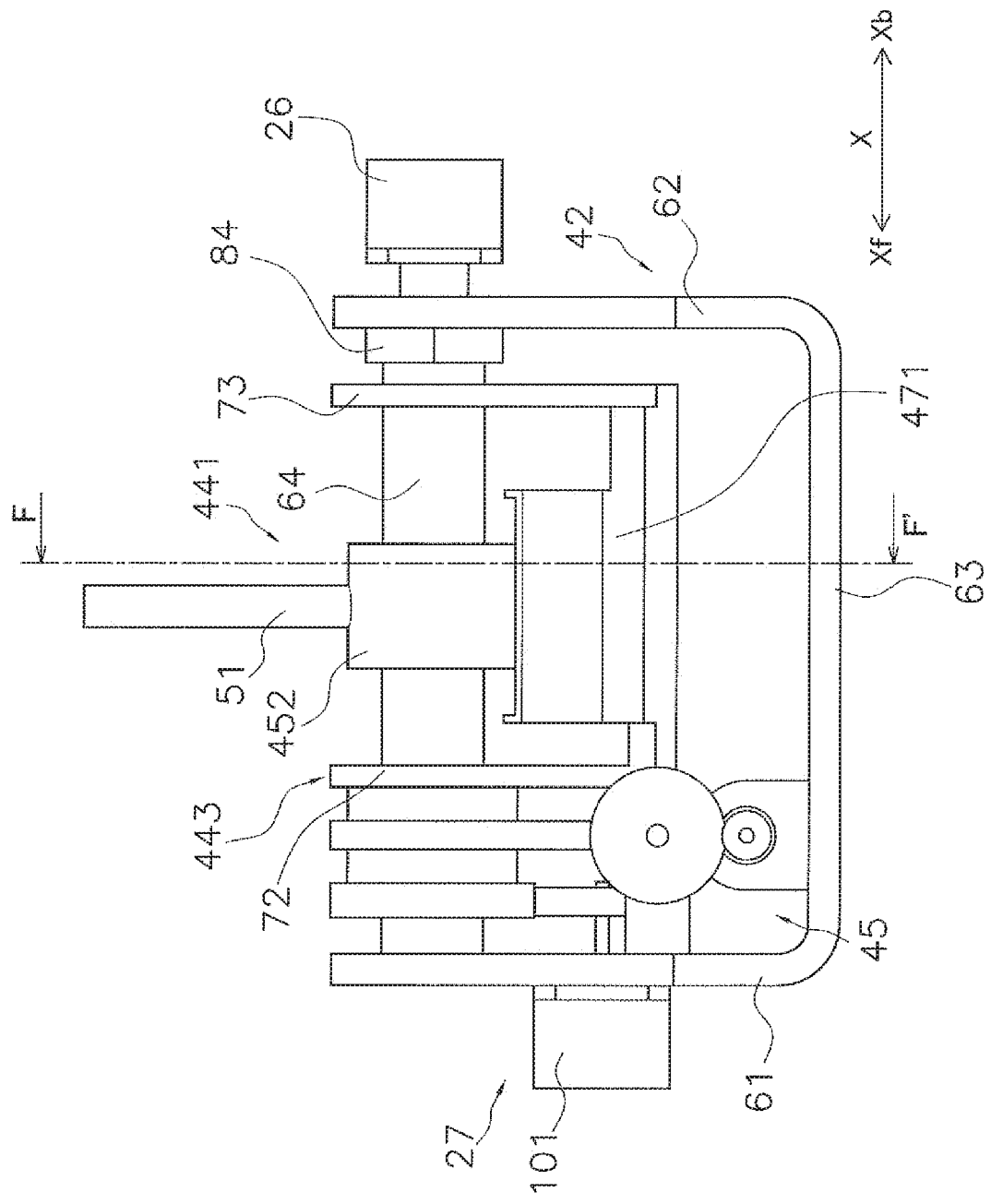
FIG. 14B is a side view illustrating the operating unit of FIG. 14A.
Figure 14C:
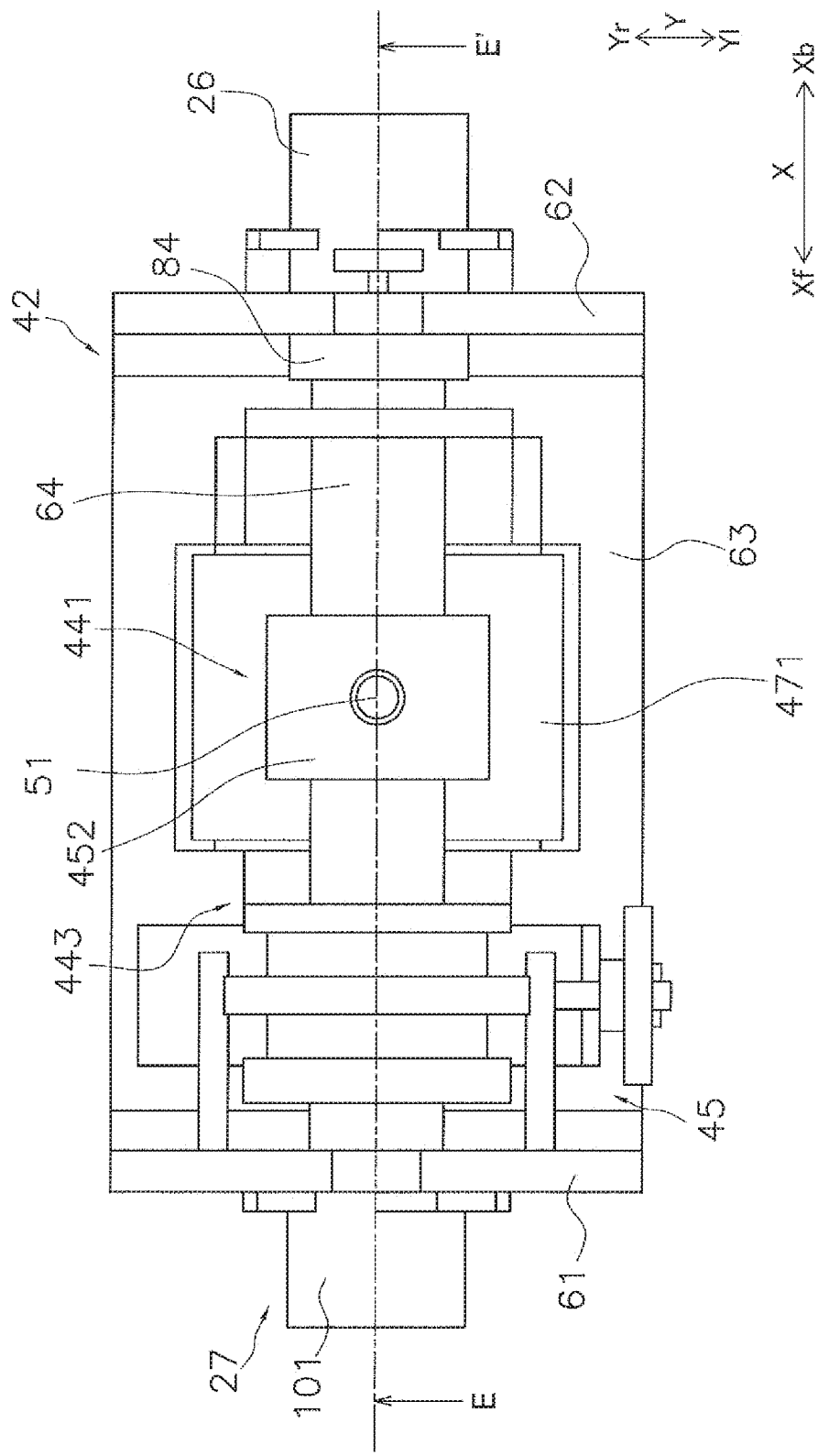
FIG. 14C is a plan view illustrating the operating unit of FIG. 14A.
Figure 14D:
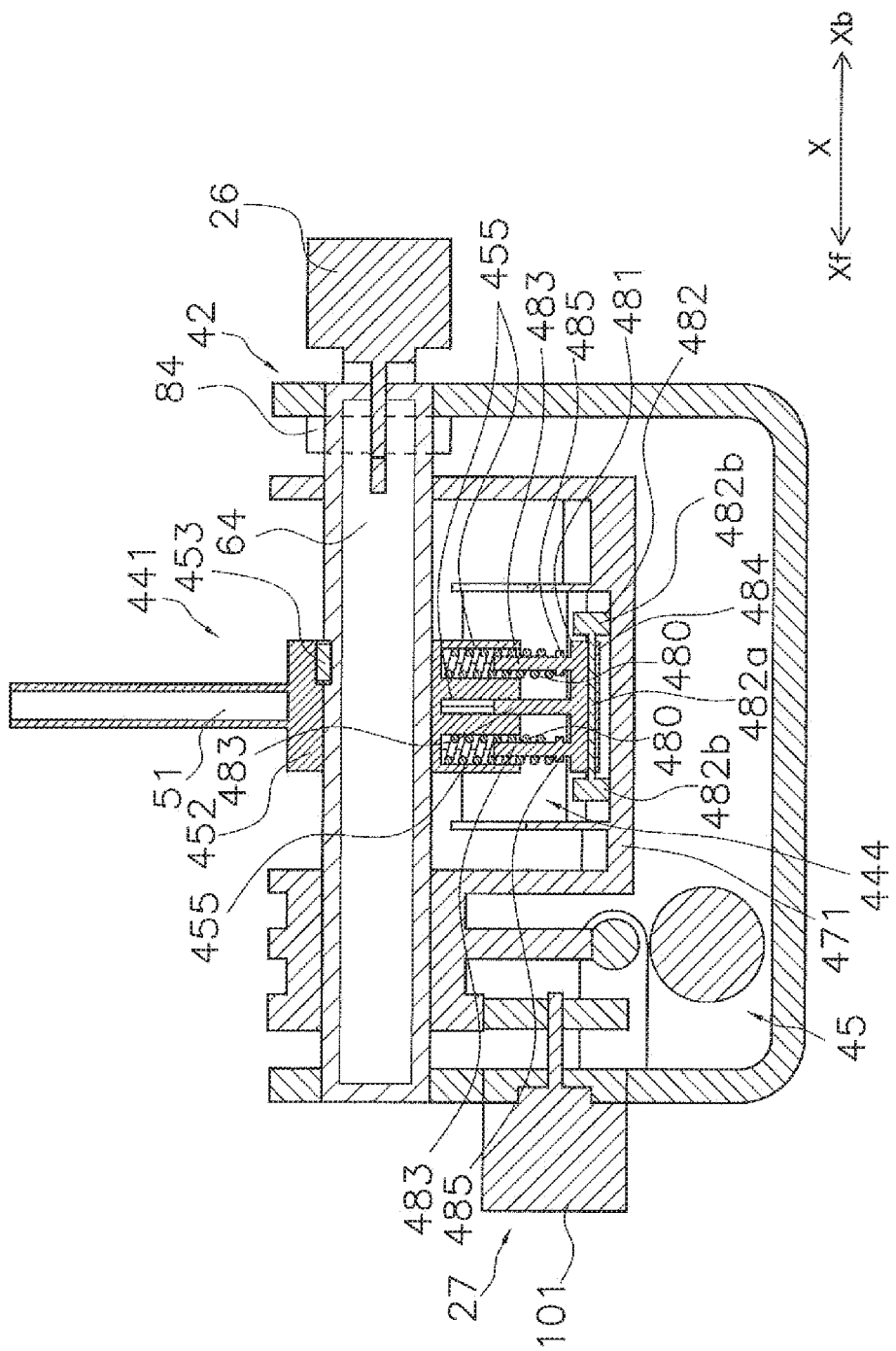
FIG. 14D is a reference arrow cross-sectional view along line E to E' in FIG. 14C.
Figure 14E:
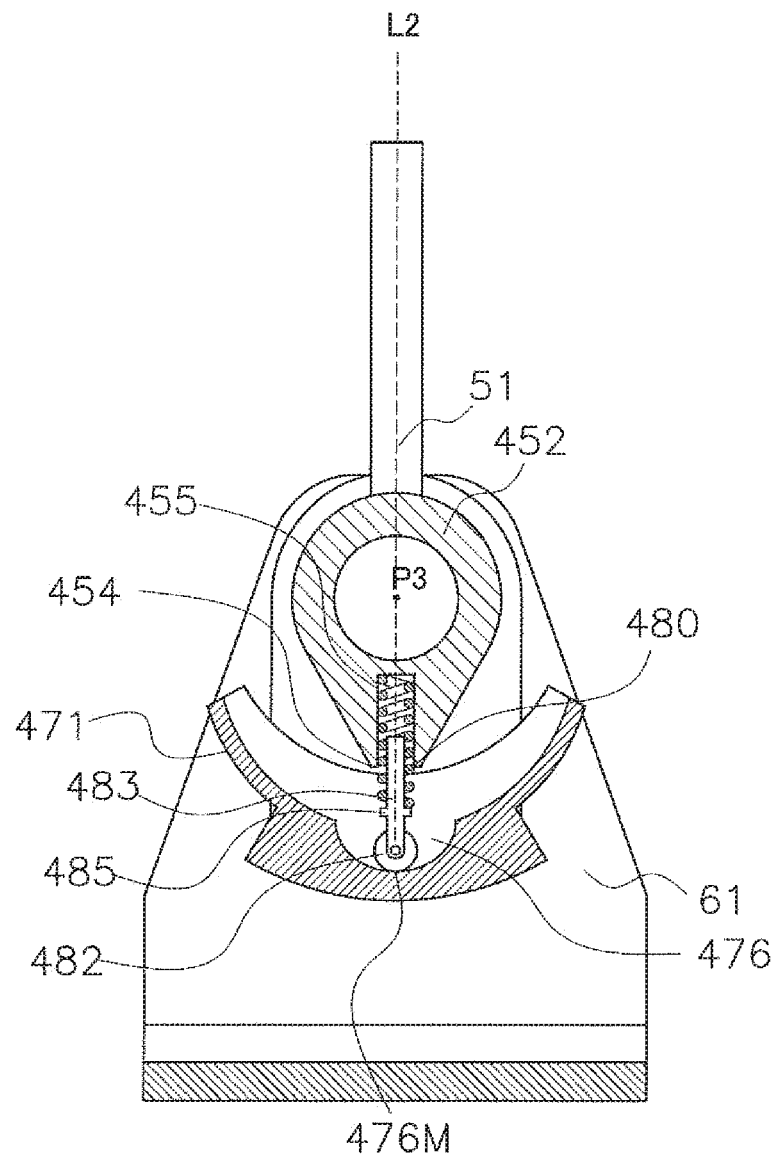
FIG. 14E is a reference arrow cross-sectional view along line F to F' in FIG. 14B.

FIG. 14A is a perspective view of the operating unit 425 of the present embodiment. FIG. 14B is a side view of FIG. 14A. FIG. 14C is a plan view of FIG. 14A. FIG. 14D is a reference arrow cross-sectional view along line E to E' in FIG. 14C. FIG. 14E is a reference arrow cross-sectional view along line F to F' in FIG. 14B.

(1. Lever Unit 441)

The lever unit 441 of the present embodiment has the joystick lever 51 and a coupling part 452 that couples the joystick lever 51 to the rotating shaft 64. The joystick lever 51 corresponds to an example of the operating part.

The joystick lever 51 is fixed to the coupling part 452. The coupling part 452 is a member having a thickness in the front-back direction X, an upper part has a semicircular shape and a lower half has a triangular shape as seen in the cross-section as illustrated in FIG. 14E. The coupling part 452 has a through-hole formed therein in the front-back direction X, and the rotating shaft 64 is inserted into the through-hole. As illustrated in FIG. 14D, recessed parts are formed in the coupling part 452 and the rotating shaft 64, and a key 453 is fitted into the recessed parts. The rotation of the joystick lever 51 is transmitted to the rotating shaft 64 via the coupling part 452 by means of the key 453.

As illustrated in FIG. 14E, a lower end 454 that is the tip end of the triangular shape of the coupling part 452 is positioned on a line L2 in the longitudinal direction of the joystick lever 51. Holes 455 along the line L2 are formed at the lower end 454 of the coupling part 452. As illustrated in FIG. 14D, three holes 455 are formed side by side in the front-back direction X.

(2. Biasing Part 444)

As illustrated in FIG. 14D, the biasing part 444 has spring members 480, a cam 481, a cam follower 482, and the damper 84. The spring members 480 are arranged inside the front and rear holes 455 excluding the middle hole 455 among the three holes 455. The cam 481 has three rod-like parts 483 and a cam follower support part 484. The three rod-like parts 483 are inserted into the respective holes 455 from below. The middle hole 455 is formed substantially coaxially with the rod-like parts 483 and functions as a guide. Abutting parts 485 are formed in the proximity to the lower ends of two of the rod-like parts 483 excluding the middle rod-like part in the front-back direction X, and abut against the lower ends of the spring members 480. The cam follower support part 484 is provided at the lower side of the three rod-like parts 483 and is fixed to the lower ends of the three rod-like parts 483. A through-hole is formed in the front-back direction of the cam follower support part 484 and a shaft part 482a of the cam follower 482 is arranged in the through-hole.

The cam follower 482 has the shaft part 482a and rotating parts 482b that are arranged at both ends of the cam follower 482. As a result, the cam follower 482 is configured to be rotatable with respect to the cam follower support part 484.

(3. Base Part 443)

In addition, a base part 443 of the third embodiment has the base plate 471 that has a different shape than the base plate 71 in comparison to the base part 43 of the first embodiment. As illustrated in FIG. 14E, the base plate 471 has a groove part 476 that is curved in a convex shape that points downward. The groove part 476 is curved toward a middle 476M in the vehicle width direction Y.

The cam follower 482 is pressed against the bottom surface of the groove part 476 by the elastic force of the spring members 480.

According to the above configuration of the biasing part 444, the lever unit 441 is biased with respect to the base plate 471 to a position where the straight line L2 passes through the middle 476M of the groove part 476.

Figure 14F:
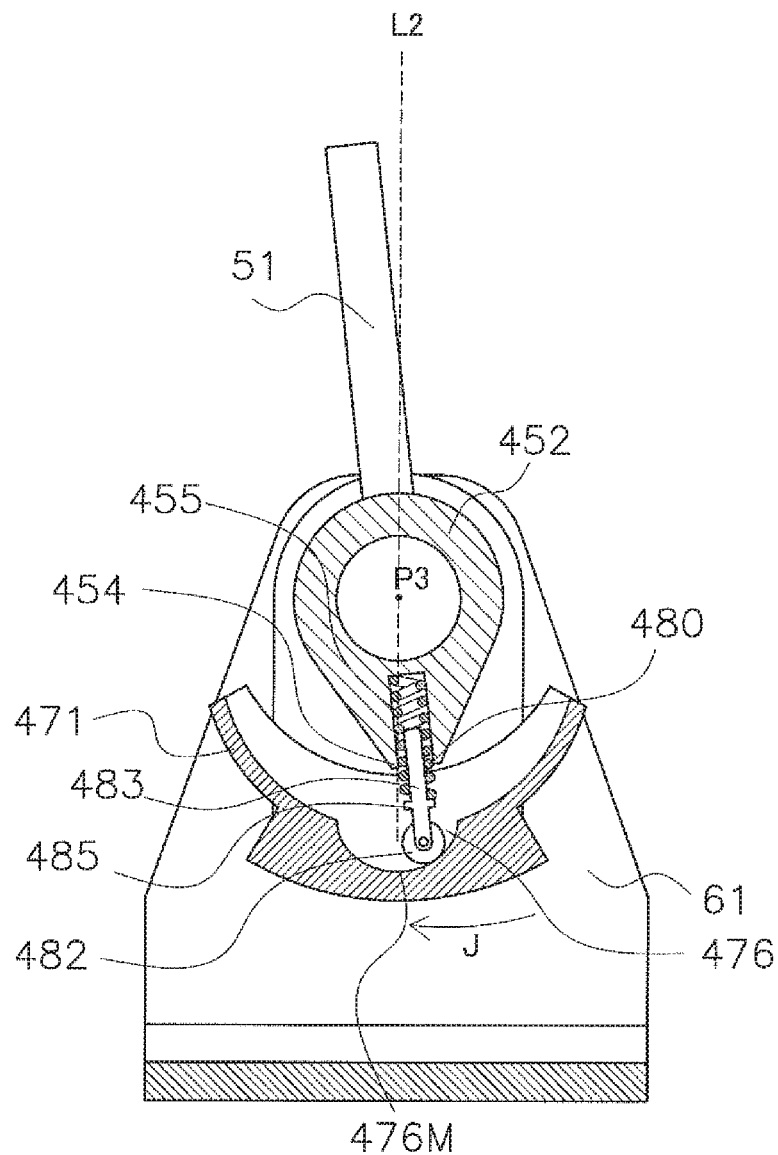
FIG. 14F is a cross-sectional view for explaining an action of the operating unit in FIG. 14E.

For example, as illustrated in FIG. 14F, in the state in which the joystick lever 51 rotates leftward and the base plate 471 does not rotate, the cam follower 482 is pressed against the bottom surface of the groove part 476 by the biasing force of the spring members 480, and a force acts on the cam follower 482 so that the cam follower 482 rotates toward the middle 476M (see arrow J).

In this way, the lever unit 441 is biased with respect to the base plate 471 so that the cam follower 482 is positioned in the middle 476M. Consequently, a counterforce can be produced when the operator operates the joystick lever 51 and an operational feel can be imparted to the operator.

<Characteristics>

(1)

The wheel loader 1 (example of the work vehicle) of the present embodiments is provided with the steering cylinders 21 and 22 (example of the hydraulic actuator), the vehicle body frame angle sensor 24 (example of the actual steering angle detecting part), the operating unit 25, 325, 425, the motor drive control part 110 (example of the position adjustment control part), and the steering control part 120. The steering cylinders 21 and 22 change the actual vehicle body frame angle θs_real (example of the actual steering angle). The vehicle body frame angle sensor 24 detects the actual vehicle body frame angle θs_real as the detection value θs_detect of the vehicle body frame angle. The operating unit 25, 325, 425 has the support part 42, the base plate 71, 471 (example of the rotating part), the joystick lever 51 (example of the operating part), the biasing part 44, 444, the position adjusting part 45, and the lever absolute angle sensor 26 (example of the first rotation angle detecting part), and the operating unit 25, 325, 425 performs a steering operation. The base plate 71 is rotatably supported by the support part 42. The joystick lever 51 is rotatably supported by the support part 42 and is operated and rotated by the operator. The biasing part 44, 444 biases the joystick lever 51 to a predetermined position with respect to the base plate 71. The position adjusting part 45 adjusts the rotation angle of the base plate 71 with respect to the support part 42. The lever absolute angle sensor 26 detects the actual lever angle θi_real (example of the rotation angle) of the joystick lever 51 (example of the operating part) with respect to the support part 42, as the detection value θi_detect of the lever angle. The motor drive control part 110 (example of the position adjustment control part) controls the position adjusting part 45 on the basis of the detection value θs_detect of the vehicle body frame angle. The steering control part 120 controls the steering cylinders 21 and 22 (examples of the hydraulic actuator) on the basis of the difference between the detection value θic_detect (example of the input steering angle) of the converted lever angle corresponding to the detection value θi_detect (example of the rotation angle) of the lever angle, and the detection value $\theta s\_detect$ (example of the actual steering angle) of the vehicle body frame angle.

As a result, an operational feel is imparted by the biasing part 44, 444 to the operation of the joystick lever 51 by the operator, whereby an actuator such as a motor for generating an operational feel is not used. As a result, the size of the operating unit 25, 325, 425 can be reduced. In addition, the actual vehicle body frame angle $\theta s\_real$ can be reflected onto the position of the base plate 71, and a counterforce that corresponds to the actual vehicle body frame angle $\theta s\_real$ can be imparted to the joystick lever 51.

In addition, the steering cylinders 21 and 22 can be controlled on the basis of the actual lever angle $\theta i\_real$.

In addition, the steering cylinders 21 and 22 can be controlled by using a value that corresponds to the difference between the detection value $\theta s\_detect$ of the vehicle body frame angle and the detection value $\theta ic\_detect$ of the converted lever angle which is obtained by converting the detection value $\theta i\_detect$ of the lever angle to the angle scale of the vehicle body frame angle.

As a result, the steering cylinders 21 and 22 can be controlled on the basis of the detection value $\theta ic\_detect$ (example of the input steering angle) of the converted lever angle and the actual vehicle body frame angle $\theta s\_real$ (example of the actual steering angle).

(2)

The wheel loader 1 (example of the work vehicle) of the present embodiments is provided with the steering cylinders 21 and 22 (example of the hydraulic actuator), the vehicle body frame angle sensor 24 (example of the actual steering angle detecting part), the operating unit 25, 325, 425, the motor drive control part 110 (example of the position adjustment control part), and the steering control part 120. The steering cylinders 21 and 22 change the actual vehicle body frame angle $\theta s\_real$ (example of the actual steering angle). The vehicle body frame angle sensor 24 detects the actual vehicle body frame angle $\theta s\_real$ as the detection value $\theta s\_detect$ of the vehicle body frame angle. The operating unit 25, 325, 425 has the support part 42, the base plate 71, 471 (example of the rotating part), the joystick lever 51 (example of the operating part), the biasing part 44, 444, the position adjusting part 45, and the lever relative angle sensor 326 (example of the second rotation angle detecting part), and the operating unit 25, 325, 425 performs a steering operation. The base plate 71 is rotatably supported by the support part 42. The joystick lever 51 is rotatably supported by the support part 42 and is operated and rotated by the operator. The biasing part 44, 444 biases the joystick lever 51 to a predetermined position with respect to the base plate 71. The position adjusting part 45 adjusts the rotation angle of the base plate 71 with respect to the support part 42. The lever relative angle sensor 326 detects the actual lever relative angle $\theta d\_real$ (example of the rotation angle) of the joystick lever 51 (example of the operating part) with respect to the base plate 71, 471, as the detection value $\theta d\_detect$ of the lever relative angle. The motor drive control part 110 (example of the position adjustment control part) controls the position adjusting part 45 on the basis of the detection value $\theta s\_detect$ of the vehicle body frame angle. The steering control part 120 (example of the steering control part) controls the steering cylinders 21 and 22 on the basis of the detection value $\theta d\_detect$ of the lever relative angle.

As a result, an operational feel is imparted by the biasing part 44, 444 to the operation of the joystick lever 51 by the operator, whereby an actuator such as a motor for generating an operational feel is not used. As a result, the size of the operating unit 25, 325, 425 can be reduced. In addition, the actual vehicle body frame angle $\theta s\_real$ can be reflected onto the position of the base plate 71, and a counterforce that corresponds to the actual vehicle body frame angle $\theta s\_real$ can be imparted to the joystick lever 51.

Moreover, the actual lever relative angle $\theta d\_real$ (example of the rotation angle) corresponds to the difference between the detection value $\theta ic\_detect$ (example of the input steering angle) of the converted lever angle and the actual vehicle body frame angle $\theta s\_real$ (example of the actual steering angle), whereby the steering cylinders 21 and 22 can be controlled on the basis of the detection value $\theta ic\_detect$.

(3)

In the wheel loader 1 (example of the work vehicle) of the present embodiments, the actual base plate angle $\theta b\_real$ (example of the rotation angle) of the base plate 71, 471 (example of the rotating part) adjusted by the position adjusting part 45, corresponds to the actual vehicle body frame angle $\theta s\_real$ (example of the actual steering angle).

Consequently, the actual vehicle body frame angle $\theta s\_real$ can be reflected in the position of the base plate 71, 471.

(4)

In the wheel loader 1 (example of the work vehicle) of the present embodiments, the position adjusting part 45 has the electric motor 91 (example of the actuator), and the speed reduction gear 93 and the worm gear 94 (example of the speed reducing part). The electric motor 91 is a driving source. The speed reduction gear 93 and the worm gear 94 reduce the speed of the rotation of the electric motor 91 and transmit the rotation to the rotating part.

Consequently, the base plate 71, 471 (example of the rotating part) can be rotated by driving the electric motor 91. The position adjusting part 45 only rotates the base plate 71, 471 (example of the rotating part) so that the actual vehicle body frame angle $\theta s\_real$ (example of the actual steering angle) is reflected in the position of the base plate 71, 471. That is, the speed reducing part having a high speed reduction ratio is used and the electric motor 91 having a low torque can be used in order to not impart a counterforce to the operation of the joystick lever 51 (example of the operating part). As a result, a small electric motor 91 can be used and the size of the operating unit 25 can be reduced.

(5)

The wheel loader 1 (example of the work vehicle) of the present embodiments has the biasing part 44, 444 and the damper 84.

Resistance when starting to move the joystick lever 51 can be produced.

(6)

In the wheel loader 1 (example of the work vehicle) of the present embodiments, the wheel loader 1 is an articulated type in which the rear frame 12 is coupled to the front frame 11. The actual vehicle body frame angle $\theta s\_real$ (example of the actual steering angle) is the angle of the front frame 11 with respect to the rear frame 12.

Consequently, an articulated action can be performed by operating the joystick lever 51.

(7)

The joystick lever 51 is provided in the wheel loader 1 (example of the work vehicle) of the present embodiments.

As a result, the actual vehicle body frame angle $\theta s\_real$ (example of the actual steering angle) can be changed by an operator operating the joystick lever 51.

(8)

The wheel loader 1 (example of the work vehicle) of the present embodiments is further provided with a solenoid pilot valve 33 (example of the control valve). The solenoid pilot valve 33 (example of the control valve) controls the flow rate of oil supplied to the steering cylinders 21 and 22 (example of the hydraulic actuator) on the basis of the rotation action of the joystick lever 51 (example of the operating part). The solenoid pilot valve 33 is in the neutral position while the joystick lever 51 is arranged in the predetermined position.

Consequently, while the joystick lever 51 is arranged in the predetermined position with respect to the base plate 71, 471 (example of the rotating part), the actual vehicle body frame angle θs_real (example of the actual steering angle) is not changed, and when the position of the joystick lever 51 with respect to the base plate 71, 471 moves from the predetermined position, on the basis of the difference thereof, the steering cylinders 21 and 22 are controlled and the actual vehicle body frame angle θs_real can be changed.

(9)

The wheel loader 1 (example of the work vehicle) of the present embodiments is further provided with the hydraulic valve 31 (example of the steering valve). The hydraulic valve 31 adjusts the flow rate supplied to the steering cylinders 21 and 22 (example of the hydraulic actuator) on the basis of the pilot pressure supplied from the solenoid pilot valve 33 (example of the control valve). The solenoid pilot valve 33 (example of the control valve) adjusts the pilot pressure thereby controlling the flow rate of oil supplied from the hydraulic valve 31 to the steering cylinders 21 and 22.

As a result, the pilot pressure is adjusted by an operation of the operator, the supply amount of oil to the steering cylinders 21 and 22 from the hydraulic valve 31 is controlled, and the actual steering angle is changed.

(10)

The control method of the wheel loader 1 (example of the work vehicle) of the present embodiments is provided with the step S10 (example of the detecting step), the step S30 (example of the driving step), and the step S70 (example of the position adjusting step). The step S10 involves detecting the actual lever angle θi_real (example of the rotation angle) of the joystick lever 51 (example of the operating part) rotatably supported by the support part 42 and biased to a predetermined position with respect to the base plate 71, 471 (example of the rotating part) rotatably supported by the support part 42, with respect to the support part 42, as the detection value θi_detect of the lever angle, or detecting the act lever relative angle θd_real as the detection value θd_detect of the lever relative angle. Step S30 involves driving the steering cylinders 21 and 22 (example of the hydraulic actuator) on the basis of the difference between the detection value θic_detect (example of the input steering angle) of the converted lever angle corresponding to the detection value θi_detect of the lever angle of the joystick lever 51, and the detection value θs_detect (example of the actual steering angle) of the vehicle body frame angle, and changing the actual vehicle body frame angle θs_real (example of the actual steering angle). Step S70 involves adjusting the rotation position of the base plate 71, 471 rotatably supported by the support part 42, on the basis of the actual vehicle body frame angle θs_real.

As a result, an operational feel is imparted by the spring member 80 to the operation of the joystick lever 51 by the operator, whereby an actuator such as a motor for generating an operational feel is not used. As a result, the size of the operating unit 25, 325, 425 provided with the joystick lever 51 can be reduced. In addition, the actual vehicle body frame angle θs_real can be reflected onto the position of the base plate 71, and a counterforce that corresponds to the actual vehicle body frame angle θs_real can be imparted to the joystick lever 51.

(11)

The control method of the wheel loader 1 (example of the work vehicle) of the present embodiments is provided with the step S10 (example of the detecting step), the step S30 (example of the driving step), and the step S70 (example of the position adjusting step). The step S10 involves detecting the actual lever relative angle θi_real (example of the rotation angle) of the joystick lever 51 (example of the operating part) rotatably supported by the support part 42 and biased to a predetermined position with respect to the base plate 71, 471 (example of the rotating part) rotatably supported by the support part 42, with respect to the base plate 71, 471, as the detection value θd_detect of the lever relative angle. Step S30 involves driving the steering cylinders 21 and 22 (examples of the hydraulic actuator) on the basis of the detection value θd_detect of the lever relative angle of the joystick lever 51 and changing the actual vehicle body frame angle θs_real (example of the actual steering angle). Step S70 involves adjusting the rotation position of the base plate 71, 471 rotatably supported by the support part 42, on the basis of the actual vehicle body frame angle θs_real.

As a result, an operational feel is imparted by the spring member 80 to the operation of the joystick lever 51 by the operator, whereby an actuator such as a motor for generating an operational feel is not used. As a result, the size of the operating unit 25, 325, 425 provided with the joystick lever 51 can be reduced. In addition, the actual vehicle body frame angle θs_real can be reflected onto the position of the base plate 71, and a counterforce that corresponds to the actual vehicle body frame angle θs_real can be imparted to the joystick lever 51.

OTHER EMBODIMENTS

While an embodiment of the present disclosure has been explained above, the present disclosure is not limited to the above embodiments and various changes are possible within the scope of the present disclosure.

(A)

While the electric motor 91 is an example of an actuator for rotating the base plate 71, 471 in the above embodiment, the actuator is not limited to an electric motor and may be a hydraulic motor, or in short an actuator that is able to produce the force to be imparted.

(B)

While the worm gear 94 is used to transmit the driving power of the electric motor 91 to the transmission gear part 74 in the above embodiment, a spur gear or a pulley may be used for transmitting the driving power of the electric motor 91 to the transmission gear part 74 without using a worm gear. However, the use of a worm gear is preferred in order to have a self-locking function.

(C)

While the above embodiment is configured so that the supply amount of oil to be supplied from the hydraulic valve 31 hydraulic valve 31 to the steering cylinders 21 and 22 is controlled in response to the pilot pressure inputted from the solenoid pilot valve 33 which is an example of a control valve, the oil may be supplied directly to the steering cylinders 21 and 22 from the solenoid pilot valve 33 without the intermediation of the hydraulic valve 31. That is, a solenoid main valve may be used in place of the solenoid pilot valve 33.

(D)

While the damper 84 is provided to the biasing part 44, 444 in the above embodiment, the present disclosure is not limited to a damper and a friction brake may be provided, or the damper or the friction brake may not be provided.

(E)

While the ranges of the base plate angle and the lever angle (angle scales) are narrower than the range of the vehicle body frame (angle scale) in the above embodiment, said ranges may be equal to or wider than the range of the vehicle body frame angle. However, the feature of the ranges of the base plate angle and the lever angle (angle scales) being narrower than the range of the vehicle body frame (angle scale) facilitates the operation because the operating range of the operator is narrower and therefore more preferred.

(F)

While the joystick lever 51 is supported by the support part 42 in the above embodiment, the joystick lever 51 may be rotatably supported by the base plate 71, 471. Moreover, the joystick lever 51 may be rotatably supported by the base part 43, 443 provided with the base plate 71, 471.

(G)

While a wheel loader 1 is used in the explanations as an example of the work vehicle in the above embodiment, an articulated dump truck or motor grader and the like may also be used.

(H)

While the joystick lever 51 is operated as an example of an operating part and the flow rate to the steering cylinders 21 and 22 is controlled, the present disclosure is not limited to a joystick lever, and a steering wheel may be used.

Figure 15A:
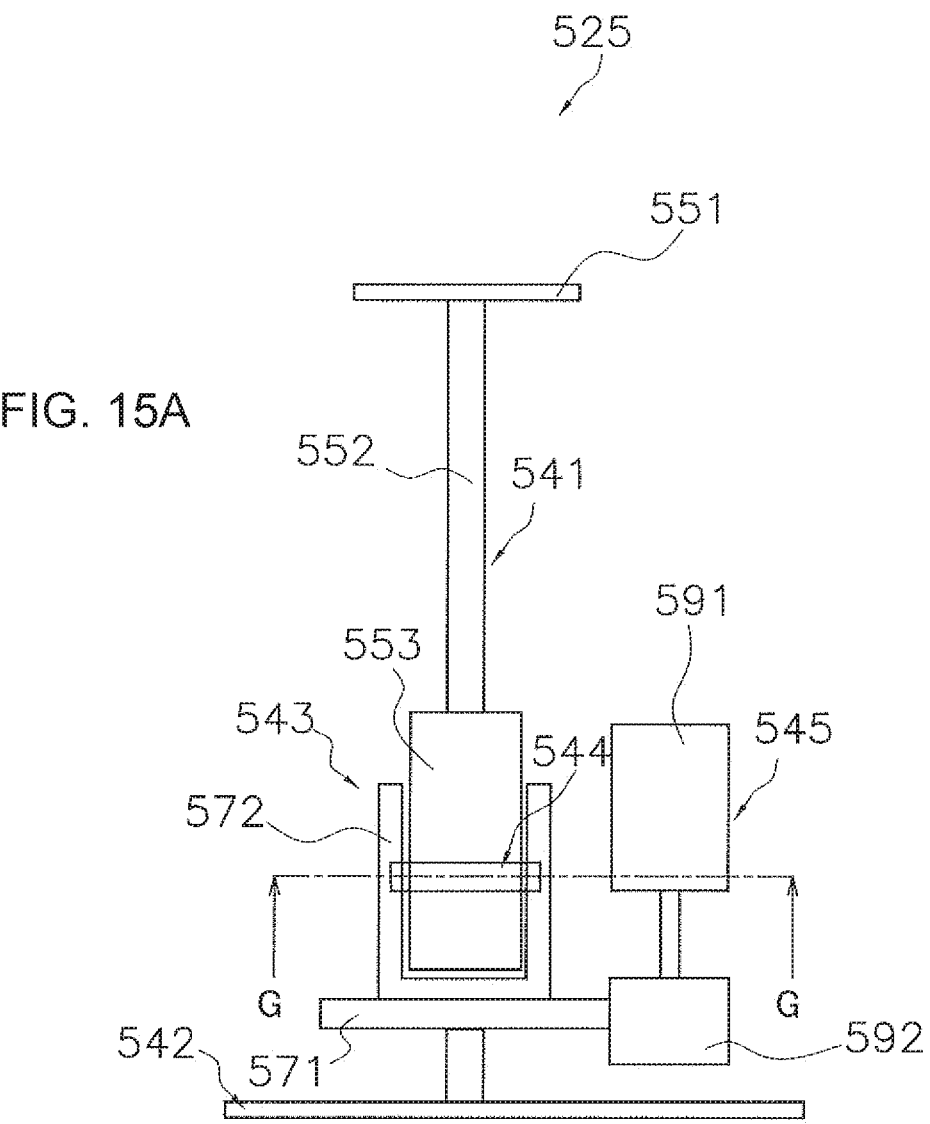
FIG. 15A is a schematic view illustrating a configuration of the operating unit of a modified example of the embodiments according to the present invention.

FIG. 15A is a schematic view illustrating a configuration when using a steering wheel 551 as an operating unit 525. A steering unit 541, a support part 542, a base part 543, a biasing part 544, and a position adjusting part 545 are provided to the operating unit 525 illustrated in FIG. 15. The steering unit 541 has the steering wheel 551, a transmission shaft 552, and a rotating member 553. The steering wheel 551 is rotated by an operator. The transmission shaft 552 couples the rotating member 553 to the steering wheel 551 and transmits the rotation of the steering wheel 551 to the rotating member 553.

The base part 543 has a rotating plate 571 and a cylindrical part 572. The support part 542 serves as a shaft support for allowing the rotating plate 571 to rotate. A gear shape is formed on the end surface of the rotating plate 571. The cylindrical part 572 is fixed to the cylindrical part 572 and the rotating member 553 is arranged inside the cylindrical part 572.

Figure 15B:
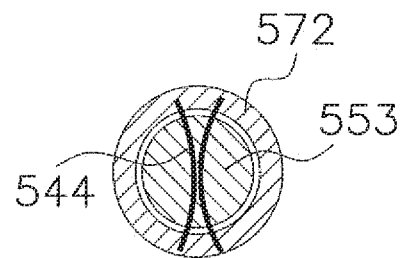
FIG. 15B is a reference arrow cross-sectional view along line G to G in FIG. 15A.

FIG. 15B is a reference arrow cross-sectional view along line G to G' in FIG. 15A. The biasing part 544 is, for example, a plate spring and penetrates the rotating member 553, and both ends of the biasing part 544 are fixed to the cylindrical part 572. The position adjusting part 545 has an electric motor 591 and an output gear 592. The output gear 592 is fixed to the output shaft of the electric motor 591 and engages with the rotating plate 571.

According to the above configuration, when the operator rotates the steering wheel 551, a counterforce is produced by the biasing part 544. In addition, the rotation angle of the rotating member 553 is detected as a detection value $\theta i\_detect$ of the rotation angle and the steering operation is performed on the basis of the detection value $\theta i\_detect$ of the rotation angle. The electric motor 591 is driven on the basis of the detection value $\theta s\_detect$ of the vehicle body frame angle, the rotating plate 571 is rotated, and the cylindrical part 573 is changed to the actual rotation angle $\theta b\_real$ that corresponds to the detection value $\theta s\_detect$ of the vehicle body frame angle.

As described above, the present invention is applicable so long as the work vehicle is one in which the steering angle is changed.

The work vehicle of the present invention demonstrates the effect of being able to reduce the size of the operating unit and is useful as a wheel loader or the like.

What is claimed is:

1. A work vehicle comprising:
a hydraulic actuator configured to change an actual steering angle;
an actual steering angle detecting part configured to detect the actual steering angle;
an operating unit configured to perform a steering operation, the operating unit including
a support part,
a rotating part supported rotatably by the support part,
an operating part supported rotatably by the support part or the rotating part, the operating part being configured to be rotated by an operator,
a biasing part configured to bias the operating part to a predetermined position with respect to the rotating part,
a position adjusting part configured to adjust a rotation angle of the rotating part with respect to the support part, and
a first rotation angle detecting part configured to detect the rotation angle of the operating part with respect to the support part;
a position adjusting control part configured to control the position adjusting part based on the actual steering angle; and
a steering control part configured to control the hydraulic actuator based on a difference between an input steering angle and the actual steering angle, the input steering angle corresponding to the rotation angle of the operating part.

2. The work vehicle according to claim 1, wherein the rotation angle of the rotating part adjusted by the position adjusting part corresponds to the actual steering angle.

3. The work vehicle according to claim 1, wherein the position adjusting part includes
an actuator configured to be a driving source, and
a speed reducing part configured to reduce a speed of rotation of the actuator and to transmit rotation to the rotating unit.

4. The work vehicle according to claim 1, wherein the biasing part includes a friction brake or a damper.

5. The work vehicle according to claim 1, wherein the work vehicle is an articulated type in which a rear frame is coupled to a front frame, and
the actual steering angle is an angle of the front frame with respect to the rear frame.

6. The work vehicle according to claim 1, wherein the operating part is a joystick lever.

7. The work vehicle according to claim 1, further comprising:
a control valve configured to control a flow rate of oil supplied to the hydraulic actuator based on a rotation operation of the operating part, the control valve being in a neutral position while the operating unit is arranged in the predetermined position.

8. The work vehicle according to claim 1, wherein the position adjusting part is disposed between the support part and the rotating part.

9. The work vehicle according to claim 1, wherein the support part is fixed to a console box disposed to a side of an operator's seat.

10. The work vehicle according to claim 1, wherein the position adjusting control part is a controller including a processor.

11. A work vehicle comprising:
a hydraulic actuator configured to change an actual steering angle;
an actual steering angle detecting part configured to detect the actual steering angle;
an operating unit configured to perform a steering operation, the operating unit including
    a support part,
    a rotating part supported rotatably by the support part,
    an operating part supported rotatably by the support part or the rotating part, the operating part being configured to be rotated by an operator,
    a biasing part configured to bias the operating part to a predetermined position with respect to the rotating part,
    a position adjusting part configured to adjust the rotation angle of the rotating part with respect to the support part, and
    a second rotation angle detecting part configured to detect the rotation angle of the operating part with respect to the rotating part;
a position adjusting control part configured to control the position adjusting part based on the actual steering angle; and
a steering control part configured to control the hydraulic actuator based on the rotation angle of the operating part.

12. The work vehicle according to claim 11, wherein the position adjusting part includes
    an actuator configured to be a driving source, and
    a speed reducing part configured to reduce a speed of rotation of the actuator and to transmit rotation to the rotating unit.

13. The work vehicle according to claim 11, wherein the biasing part includes a friction brake or a damper.

14. The work vehicle according to claim 11, wherein the work vehicle is an articulated type in which a rear frame is coupled to a front frame, and
the actual steering angle is an angle of the front frame with respect to the rear frame.

15. The work vehicle according to claim 11, wherein the operating part is a joystick lever.

16. The work vehicle according to claim 11, further comprising:
a control valve configured to control a flow rate of oil supplied to the hydraulic actuator based on a rotation operation of the operating part,
the control valve being in a neutral position while the operating unit is arranged in the predetermined position.

17. The work vehicle according to claim 11, wherein the position adjusting part is disposed between the support part and the rotating part.

18. The work vehicle according to claim 11, wherein the support part is fixed to a console box disposed to a side of an operator's seat.

19. The work vehicle according to claim 11, wherein the position adjusting control part is a controller including a processor.

* * * * *